US012092498B2

(12) United States Patent
Akama et al.

(10) Patent No.: US 12,092,498 B2
(45) Date of Patent: Sep. 17, 2024

(54) ABSOLUTE ENCODER

(71) Applicant: YAMAHA HATSUDOKI KABUSHIKI KAISHA, Iwata (JP)

(72) Inventors: Shunichi Akama, Shizuoka (JP); Shiro Fukuda, Shizuoka (JP); Yasunori Murayama, Shizuoka (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 277 days.

(21) Appl. No.: 17/866,369

(22) Filed: Jul. 15, 2022

(65) Prior Publication Data

US 2022/0364887 A1 Nov. 17, 2022

Related U.S. Application Data

(63) Continuation-in-part of application No. PCT/JP2021/001529, filed on Jan. 18, 2021.

(30) Foreign Application Priority Data

Jan. 17, 2020 (WO) .................. PCT/JP2020/001526

(51) Int. Cl.
*G01D 5/245* (2006.01)
*G01D 5/241* (2006.01)
(Continued)

(52) U.S. Cl.
CPC .......... *G01D 5/2455* (2013.01); *G01D 5/2415* (2013.01); *G01D 5/245* (2013.01); *G01D 5/2497* (2013.01); *G01D 5/347* (2013.01)

(58) Field of Classification Search
CPC .... G01D 5/2454; G01D 5/2455; G01D 5/347; G01D 5/3473; B25J 9/102; B25J 9/126
See application file for complete search history.

(56) References Cited

U.S. PATENT DOCUMENTS 10,022,861 B1 7/2018 He et al.
2011/0218761 A1* 9/2011 Lingk .................. G01D 5/2495
702/151
(Continued)

FOREIGN PATENT DOCUMENTS

CN 106976083 A 7/2017
CN 207139843 U 3/2018
(Continued)

OTHER PUBLICATIONS

International Preliminary Report on Patentability PCT/JP2021/001529 issued on Mar. 9, 2021.
(Continued)

*Primary Examiner* — Steven L Yeninas
(74) *Attorney, Agent, or Firm* — Rabin & Berdo, P.C.

(57) ABSTRACT

An absolute encoder configured to, when a rotation range of a measurement target member is limited by a brake mechanism, generate an AB-phase signal and a Z-phase signal for calculating a rotation angle of the measurement target member. The absolute encoder includes a brake mechanism, a plurality of Z-phase-signal-detection-target portions each having a Z-phase-signal-rise-detection-target portion and a Z-phase-signal-fall-detection-target portion, a plurality of AB-phase-signal-detection-target portions each located between a Z-phase-signal-rise-detection-target portion and a Z-phase-signal-fall-detection-target portion that are adjacent to each other in a circumferential direction, to thereby form a plurality of restriction ranges each including at least one of the Z-phase-signal-rise-detection-target portions and at least one of the Z-phase-signal-fall-detection-target portions. An interval in the circumferential direction between a Z-phase-signal-rise-detection-target portion and a Z-phase-signal-fall-detection-target portion that are adjacent to each other in
(Continued)

the circumferential direction is different among the plurality of restriction ranges.

12 Claims, 14 Drawing Sheets

(51) Int. Cl.
  *G01D 5/249* (2006.01)
  *G01D 5/347* (2006.01)

(56) References Cited

U.S. PATENT DOCUMENTS

| | | | |
|---|---|---|---|
| 2017/0059366 A1* | 3/2017 | Nishioka | G01D 5/24461 |
| 2018/0319012 A1 | 11/2018 | He et al. | |
| 2019/0109549 A1 | 4/2019 | Odagiri et al. | |
| 2020/0324406 A1* | 10/2020 | Ayuzawa | H02K 7/116 |

FOREIGN PATENT DOCUMENTS

| | | |
|---|---|---|
| CN | 207824926 U | 9/2018 |
| GB | 2396671 A | 6/2004 |
| JP | S63289417 A | 11/1988 |
| JP | S6474411 A | 3/1989 |
| JP | H06315879 A | 11/1994 |
| JP | H0740269 A | 2/1995 |
| JP | H1038557 A | 2/1998 |
| JP | 2004174704 A | 6/2004 |
| JP | 2005207864 A | 8/2005 |
| JP | 2006329783 A | 12/2006 |
| JP | 2010151269 A | 7/2010 |
| JP | 2011120444 A | 6/2011 |
| JP | 2013035530 A | 2/2013 |
| JP | 2017181235 A | 10/2017 |
| JP | 2017189081 A | 10/2017 |
| JP | 2019190520 A | 10/2019 |
| JP | 2020122659 A | 8/2020 |
| KR | 100863096 B1 | 10/2008 |
| KR | 1020170053499 A | 5/2017 |
| KR | 1020180060264 A | 6/2018 |
| WO | 2014207846 A1 | 12/2014 |
| WO | 2017169580 A1 | 10/2017 |
| WO | 2018055752 A1 | 3/2018 |
| WO | 2019202912 A1 | 10/2019 |

OTHER PUBLICATIONS

International Preliminary Report on Patentability PCT/JP2020/001526 issued on Feb. 25, 2020.
International Preliminary Report on Patentability PCT/JP2021/001431 issued on Apr. 6, 2021.
International Preliminary Report on Patentability PCT/JP2020/001529 issued on Apr. 7, 2020.
International Preliminary Report on Patentability PCT/JP2020/001531 issued on Mar. 17, 2020.

* cited by examiner

1: ABSOLUTE ENCODER
4: AB-PHASE-SIGNAL-DETECTING UNIT
5: Z-PHASE-SIGNAL-DETECTING UNIT
6: OUTPUT UNIT 1, 1A, 1B: ABSOLUTE ENCODER
       26: ACTUATOR
       27: MOTOR
       31: DRIVING UNIT
       32: MULTI-JOINT-ROBOT-ARM CONTROL DEVICE
       33: CORRECTION UNIT
       30: ABNORMALITY DETECTION UNIT

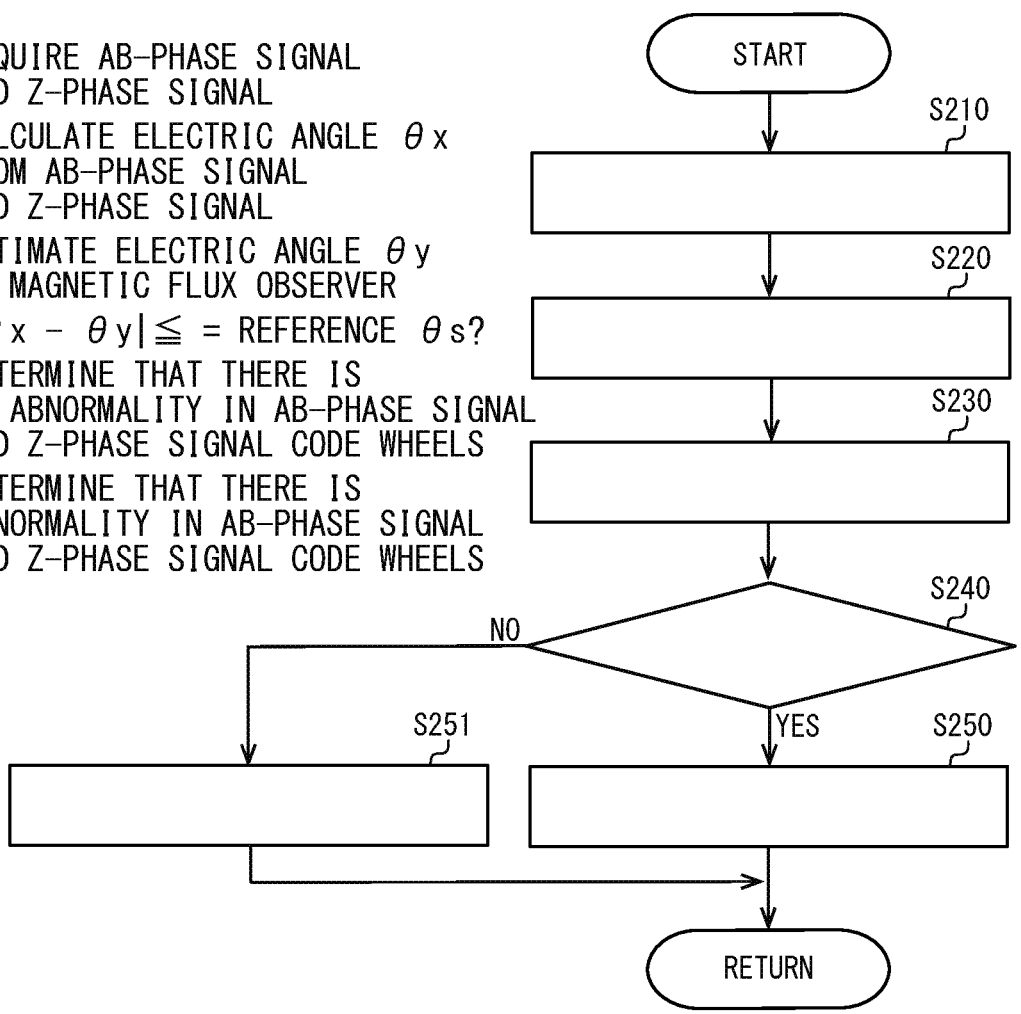

S210: ACQUIRE AB-PHASE SIGNAL
AND Z-PHASE SIGNAL
S220: CALCULATE ELECTRIC ANGLE $\theta x$
FROM AB-PHASE SIGNAL
AND Z-PHASE SIGNAL
S230: ESTIMATE ELECTRIC ANGLE $\theta y$
BY MAGNETIC FLUX OBSERVER
S240: $|\theta x - \theta y| \leqq$ = REFERENCE $\theta s$?
S250: DETERMINE THAT THERE IS
NO ABNORMALITY IN AB-PHASE SIGNAL
AND Z-PHASE SIGNAL CODE WHEELS
S251: DETERMINE THAT THERE IS
ABNORMALITY IN AB-PHASE SIGNAL
AND Z-PHASE SIGNAL CODE WHEELS

FIG. 15

ABSOLUTE ENCODER

CROSS-REFERENCE TO RELATED APPLICATION

This application is a continuation-in-part application of International Application No. PCT/JP2021/001529, filed on Jan. 18, 2021, which claims priority to International Application No. PCT/JP2020/001526, filed on Jan. 17, 2020, the entire contents of which are incorporated herein by reference.

TECHNICAL FIELD

The present teaching relates to an absolute encoder.

BACKGROUND ART

Motor systems including an encoder and a brake mechanism have been proposed, where the encoder acquires, for example, an absolute rotation angle (a mechanical angle of 360 degrees) of a rotation shaft of a motor or the like by processing signals of an optical AB-phase signal sensor that outputs a composite signal of an A-phase signal and a B-phase signal that outputs an incremental signal and a magnetic Z-phase signal sensor that outputs an absolute signal. A motor system disclosed in Patent Document 1 includes a signal detection pattern that is a detection member of the AB-phase signal sensor used for detecting the rotation angle of the motor, and a plurality of permanent magnets and a plurality of hall sensors used for signal detection and serving as detection members of a Z-phase signal sensor used for detecting an absolute position of a rotation angle within one rotation or less.

The signal detection pattern of the AB-phase signal sensor is provided on a disk fixed to the rotation shaft of the motor. The plurality of permanent magnets used for signal detection of the Z-phase signal sensor have equal lengths in a circumferential direction and are arranged in the circumferential direction of a gear type brake wheel. Furthermore, the plurality of hall sensors used for signal detection of the Z-phase signal sensor is fixed to the permanent magnets. The Z-phase signal sensor includes a plurality of magnetic sensors. In the Z-phase signal sensor, the rotation angle during one rotation of the rotation shaft of the motor is divided into twenty-four zones by the permanent magnets and the hall sensors.

The encoder counts pulses and phases of an AB-phase signal in one zone of the twenty four zones in the same rotation direction, and thus, can determine the rotation angle of the motor.

CITATION LIST

Patent Document

Patent Document 1: Japanese Patent Application Publication No. 2017-181235

SUMMARY OF INVENTION

Technical Problem

In general, in an AC brushless motor, in order to maintain a rotation angle even after power is turned on, information related to an electric angle of the brushless motor is needed. The above-described motor system including an encoder including the AB-phase signal sensor and the Z-phase signal sensor and the brake mechanism can output the information related to the electric angle of the motor to a computer in order to retain the rotation angle of the motor when lock by the brake mechanism is released after the power has been turned on. When the power is turned on, the motor system outputs information related to magnetic poles of the permanent magnets and signals of the hall sensors to the computer by the Z-phase signal sensor of the encoder. The computer calculates a zone including the rotation angle of the motor. The computer calculates a coarse electric angle of the motor from the calculated zone.

As described above, the Z-phase signal sensor of the encoder disclosed in Patent Document 1 needs the plurality of permanent magnets, the plurality of magnetic sensors, the plurality of hall sensors, and a dedicated IC chip different from an IC chip provided for the AB-phase signal sensor in order to calculate the electric angle of the motor the rotation range of which is restricted by the brake mechanism. Therefore, a configuration of the Z-phase signal sensor is complicated. Furthermore, the encoder needs the disk on which the signal pattern of the optical AB-phase signal sensor is provided and the gear-type brake wheel on which the permanent magnets and the plurality of hall sensors of the magnetic Z-phase signal sensor are provided. Therefore, a configuration of the encoder is complicated. Thus, an absolute encoder is desired that, even when a rotation range of a measurement target member is limited by a brake mechanism, can output a signal from which the rotation angle of the measurement target member can be calculated by a simple configuration.

It is therefore an object of the present teaching to provide an absolute encoder that, even when a rotation range of a measurement target member is limited by a brake mechanism, can generate an AB-phase signal and a Z-phase signal from which the rotation angle of the measurement target member can be calculated, by a simple configuration.

Solution to Problem

The inventors of the present teaching conducted studies on a configuration of an absolute encoder that, even when a rotation range of a measurement target member is limited by a brake mechanism, outputs a signal from which the rotation angle of the measurement target member can be calculated, by a simple configuration. Through an intensive study, the inventors of the present teaching have reached the following configuration.

An absolute encoder according to one embodiment of the present teaching for acquiring a rotation angle of a measurement target member within a mechanical angle of 360 degrees, includes a brake mechanism including a rotary body including a plurality of engaging protrusions and an engaging pin that engages with one of the plurality of engaging protrusions, a plurality of AB-phase-signal-detection-target portions that are arranged at equal intervals in a circumferential direction within the mechanical angle of 360 degrees and that are configured to generate AB-phase signals, a plurality of Z-phase-signal-detection-target portions, each including a Z-phase-signal-rise-detection-target portion that generates a rise of a Z-phase signal, and a Z-phase-signal-fall-detection-target portion that generates a fall of the Z-phase signal, the plurality of AB-phase-signal-detection-target portions being arranged in the circumferential direction within the range of the mechanical angle of 360 degrees, such that the Z-phase-signal-rise-detection-target portions and the Z-phase-signal-fall-detection-target portions are alternately located in the circumferential direction, to thereby form a plurality of first intervals in the circumferential direction, each between one of the Z-phase-signal-rise-detection-target portions and one of the Z-phase-signal-fall-detection-target portions that are adjacent to each other in the circumferential direction, a plurality of second intervals in the circumferential direction, each between one of the Z-phase-signal-rise-detection-target portions and one of the Z-phase-signal-rise-detection-target portions that are adjacent to each other in the circumferential direction, and a plurality of third intervals in the circumferential direction, each between one of the Z-phase-signal-fall-detection-target portions and one of the Z-phase-signal-fall-detection-target portions that are adjacent to each other in the circumferential direction, and an output unit that is configured to output the AB-phase signals and the Z-phase signals.

The AB-phase-signal-detection-target portions, the Z-phase-signal-rise-detection-target portions, the Z-phase-signal-fall-detection-target portions, and the rotary body integrally rotate. The engaging protrusions of the rotary body are positioned to divide a rotation range of the rotary body into a plurality of restriction ranges. The plurality of Z-phase-signal-detection-target portions are so arranged that each of the AB-phase-signal-detection-target portions is located between one of the Z-phase-signal-rise-detection-target portions and one of the Z-phase-signal-fall-detection-target portions that are adjacent to each other in the circumferential direction, and each of the plurality of restriction ranges includes at least one of the Z-phase-signal-rise-detection-target portions, and one of the Z-phase-signal-fall-detection-target portions, wherein the first intervals in the restriction ranges are different from each other, and/or the second intervals in the restriction ranges are different from each other, and/or the third intervals in the restriction ranges are different from each other.

With the above-described configuration, in a case where a rotation range of the absolute encoder is limited by the brake mechanism, the absolute encoder generates the AB-phase signal and the Z-phase signal by rotation by a motor or the like that is a measurement target member within the rotation range. The absolute encoder outputs the AB-phase signal and the Z-phase signal generated within the rotation range to a computer.

In the absolute encoder, the Z-phase-signal-rise-detection-target portions and the Z-phase-signal-fall-detection-target portions are arranged such that an interval defined by a combination of the Z-phase-signal-rise-detection-target portion and the Z-phase-signal-fall-detection-target portion differs for each of the plurality of restriction ranges obtained by dividing the rotation range by the brake mechanism. Based on the interval of the Z-phase signal acquired from the absolute encoder based on the interval of each of the plurality of restriction ranges stored in advance and the number of pulses of the AB-phase signals in the interval, the computer specifies the restriction range and specifies a mechanical angle in the restriction range. Thus, even when a rotation range of a measurement target member is limited by the brake mechanism, the absolute encoder can generate the AB-phase signal and the Z-phase signal from which the mechanical angle of the measurement target member can be calculated, by a simple configuration.

According to another aspect, the absolute encoder of the present teaching preferably includes the following configuration. The Z-phase-signal-rise-detection-target portions and the Z-phase-signal-fall-detection-target portions in the plurality of Z-phase-signal-detection-target portions are so arranged that a plurality of angle ranges are formed in the circumferential direction, each being defined by one of the first intervals, each of the plurality of engaging protrusions is located in one of the angle ranges, and one of the first intervals in one of the angle ranges is a same as at least another one of the first intervals in another one of the angle ranges. That is, the Z-phase-signal-rise-detection-target portions and the Z-phase-signal-fall-detection-target portions in the plurality of Z-phase-signal-detection-target portions are arranged such that there are one or more angle ranges in which a width of an angle range (the interval between the Z-phase-signal-rise-detection-target portion and the Z-phase-signal-fall-detection-target portion) is equal to a width of another angle range, among angle ranges in which the engaging protrusion is arranged between the Z-phase-signal-rise-detection-target portion and the Z-phase-signal-fall-detection-target portion that are adjacent to each other in the circumferential direction.

With the above-described configuration, it is not necessary to arrange the Z-phase-signal-rise-detection-target portions and the Z-phase-signal-fall-detection-target portions such that each interval in the circumferential direction defined by a combination of the Z-phase-signal-rise-detection-target portion and the Z-phase-signal-fall-detection-target portion is different from all of the other intervals. That is, the Z-phase-signal-rise-detection-target portions and the Z-phase-signal-fall-detection-target portions may be arranged such that the interval in the circumferential direction between the Z-phase-signal-rise-detection-target portion and the Z-phase-signal-fall-detection-target portion between which the engaging protrusion is interposed is the same as at least one of the intervals in the circumferential direction each between the Z-phase-signal-rise-detection-target portion and the Z-phase-signal-fall-detection-target portion between which a corresponding one of the other engaging protrusions is interposed. Thus, a variation in the intervals in the circumferential direction defined by combinations of the Z-phase-signal-rise-detection-target portions and the Z-phase-signal-fall-detection-target portions generated by the Z-phase-signal-detection-target portions can be reduced. Accordingly, each processing of acquiring a rotation angle within a mechanical angle of 360 degrees can be leveled out, so that a peak load of processing of the computer that specifies the rotation angle of the measurement target member can be reduced. In general, the computer used for executing real time control is required to have a performance with which the computer does not lose a real time property at a peak load. Accordingly, performance requirement of the computer can be simplified by reducing the peak load. Thus, even when the rotation range of the measurement target member is limited by the brake mechanism, the absolute encoder can generate the AB-phase signal and the Z-phase signal from which the rotation angle of the measurement target member can be calculated, by a simple configuration.

According to another aspect, the absolute encoder of the present teaching preferably includes the following configuration. The rotary body includes at least two engaging protrusions within the range of the mechanical angle of 360 degrees.

With the above-described configuration, in a case where the rotation angle of the measurement target member is limited by the brake mechanism using the at least two engaging protrusions, the measurement target member is limited to a rotation angle that is less than a mechanical angle of 180 degrees. Even when the measurement target member is caused to rotate in a case where power of the absolute encoder is off, the absolute encoder outputs the AB-phase signal and the Z-phase signal used for specifying the rotation angle in a range less than a mechanical angle of 180 degrees to the computer. It can be made as a premise by the brake mechanism that the rotation angle of the measurement target member is less than 180 degrees, and therefore, the computer can uniquely calculate the rotation angle of the measurement target member. Thus, the absolute encoder can generate the AB-phase signal and the Z-phase signal from which the rotation angle of the measurement target member can be calculated, by a simple configuration.

According to another aspect, the absolute encoder of the present teaching preferably includes the following configuration. The rotary body includes six engaging protrusions within the mechanical angle of 360 degrees.

With the above-described configuration, in a case where the rotation angle of the measurement target member is limited by the brake mechanism using the six engaging protrusions, the measurement target member is limited to a rotation angle less than a mechanical angle of 180 degrees even in a state where arbitrary two of the engaging protrusions are not in contact with the engaging pin. It can be made as a premise by the brake mechanism that the rotation angle of the measurement target member is less than 180 degrees, and therefore, the computer can uniquely calculate the rotation angle of the measurement target member. Thus, the absolute encoder can generate the AB-phase signal and the Z-phase signal from which the rotation angle of the measurement target member can be calculated, by a simple configuration.

According to another aspect, the absolute encoder of the present teaching preferably includes the following configuration. The first intervals are mutually different among the plurality of restriction ranges, and a difference between a first median that is a median of the first intervals and a smallest one of the first intervals, and a difference between the first median and a largest one of the first intervals, are both smaller than a half of the first median, and/or the second intervals are mutually different among the plurality of restriction ranges, and a difference between a second median that is a median of the second intervals and a smallest one of the second intervals, and a difference between the second median and a largest one of the second intervals, are both smaller than a half of the second median, and/or the third intervals are mutually different among the plurality of restriction ranges, and a difference between a third median that is a median of the third intervals and a smallest one of the third intervals, and a difference between the third median and a largest one of the third intervals, are both smaller than a half of the third median.

In the above-described configuration, the Z-phase-signal-detection-target portions are configured such that, in each of rotation angle ranges of the rotary body limited by the adjacent engaging protrusions of the brake mechanism, at least one interval of the intervals defined by combinations of the Z-phase-signal-rise-detection-target portions and the Z-phase-signal-fall-detection-target portions is different from the corresponding interval in every other rotation angle range, with variation of a predetermined range.

In a case where the intervals each between the Z-phase-signal-rise-detection-target portion and the Z-phase-signal-fall-detection-target portion that are adjacent to each other are mutually different among the restriction ranges, the computer can increase opportunities of detection of an absolute position during one rotation of the absolute encoder by causing interruption processing to occur in one of a rise or a fall of the one Z-phase signal. On the other hand, in a case where the intervals each between the Z-phase-signal-rise-detection-target portion and the Z-phase-signal-rise-detection-target portion that are adjacent to each other are mutually different among the restriction ranges or in a case where the intervals each between the Z-phase-signal-fall-detection-target portion and the Z-phase-signal-fall-detection-target portion that are adjacent to each other are mutually different among the restriction ranges, the computer can suppress a calculation load by causing interruption processing to occur in one of a rise or a fall of the one Z-phase signal.

The absolute encoder is configured such that, in an arbitrary interval in adjacent signal waveforms of the Z-phase signals, both of a difference between a median of intervals within a mechanical angle of 360 degrees and a smallest one of the intervals and a difference between the median and a largest one of the intervals are smaller than a half of the median. Thus, the absolute encoder generates the Z-phase signals such that the intervals fall in a predetermined variation range using the median as a reference at certain rotation speed. That is, the absolute encoder generates the Z-phase signals at time intervals of a predetermined time or more. Accordingly, a time interval of interruption processing in which an absolute rotation angle generated each time the Z-phase signal is acquired is calculated is a predetermined time or more, and thus, the computer connected to the absolute encoder can level out each processing of acquiring the position of the rotation angle within a mechanical angle of 360 degrees.

Thus, the degree of design freedom of a hardware resource of the computer can be increased by reducing a peak load of processing of the computer. A computer provided for real time control, such as motor control, is required not to lose real time property even at a peak load. Accordingly, a maximum processing performance of the computer can be suppressed by reducing a peak load of processing of signals from the absolute encoder. Moreover, in a case where a computer having the same processing performance is used, when the peak load of processing of signals from the absolute encoder is reduced, the computer can execute some other processing.

With the above-described configuration, the absolute encoder can facilitate processing of acquiring the rotation angle of the measurement target member. Thus, even when the range of the rotation angle of the measurement target member is limited by the brake mechanism, the absolute encoder can generate the AB-phase signal and the Z-phase signal from which the rotation angle of the measurement target member can be calculated, by a simple configuration.

According to another aspect, the absolute encoder of the present teaching preferably includes the following configuration. In a case where the first intervals are mutually different among the plurality of restriction ranges, a difference between the smallest one of the first intervals and the largest one of the first intervals is smaller than the half of the first median.

In a case where the second intervals are mutually different among the plurality of restriction ranges, a difference between the smallest one of the second intervals and the largest one of the second intervals is smaller than the half of the second median.

In a case where the third intervals are mutually different among the plurality of restriction ranges, a difference between the smallest one of the third intervals and the largest one of the third intervals is smaller than the half of the third median.

Moreover, the Z-phase-signal-rise-detection-target portions and the Z-phase-signal-fall-detection-target portions in the Z-phase-signal-detection-target portions are arranged such that in a case where intervals each from a fall to a rise in adjacent signal waveforms, in the plurality of Z-phase signals in rotation angle ranges of the rotary body limited by the adjacent engaging protrusions of the brake mechanism, are mutually different, a difference between a smallest interval of the intervals from the fall to the rise in the adjacent signal waveforms and a largest interval of the intervals is smaller than the half of the median.

In the above-described configuration, in the absolute encoder, the Z-phase-signal-rise-detection-target portions and the Z-phase-signal-fall-detection-target portions are arranged such that the intervals defined by combinations of the Z-phase-signal-rise-detection-target portions and the Z-phase-signal-fall-detection-target portions fall in a predetermined variation range using the median as a reference at certain rotation speed. Thus, even when the range in which the measurement target member can rotate is limited by the brake mechanism, the absolute encoder can generate the AB-phase signal and the Z-phase signal from which the rotation angle of the measurement target member can be calculated, by a simple configuration. Moreover, the degree of design freedom of a hardware resource of the computer can be increased by reducing a processing load of the computer.

According to another aspect, the absolute encoder of the present teaching preferably includes the following configuration. The absolute encoder includes a rotating plate that integrally rotates with the rotary body. The rotating plate is configured as one or more rotating plates that integrally rotate with the brake mechanism. That is, the plurality of AB-phase-signal-detection-target portions, the plurality of Z-phase-signal-rise-detection-target portions, and the plurality of Z-phase-signal-fall-detection-target portions, are formed on the rotating plate.

The AB-phase-signal-detection-target portions and the Z-phase-signal-detection-target portions are both provided on the rotating plate. Accordingly, the AB-phase-signal-detection-target portions and the Z-phase-signal-detection-target portions are integrally provided on the measurement target member or the rotary body in a state where phases are fixed. Thus, even when the range in which the measurement target member can rotate is limited by the brake mechanism, the absolute encoder can generate the AB-phase signal and the Z-phase signal from which the rotation angle of the measurement target member can be calculated, by a simple configuration.

According to another aspect, the absolute encoder of the present teaching preferably includes the following configuration. The rotary body configured as the brake mechanism includes the plurality of AB-phase-signal-detection-target portions and the plurality of Z-phase-signal-detection-target portions. That is, the plurality of AB-phase-signal-detection-target portions, the plurality of Z-phase-signal-detection-target portions, and the brake mechanism are provided as the same rotary body.

In the above-described configuration, the AB-phase-signal-detection-target portions and the Z-phase-signal-detection-target portions are integrally provided on the rotary body of the brake mechanism in a state where phases are fixed. Thus, even when the range in which the measurement target member can rotate is limited by the brake mechanism, the absolute encoder can generate the AB-phase signal and the Z-phase signal from which the rotation angle of the measurement target member can be calculated, by a simple configuration.

According to another aspect, the absolute encoder of the present teaching preferably includes the following configuration. The absolute encoder includes an abnormality detection unit configured as a hardware that detects an abnormality of the Z-phase signal due to deformation of the rotary body, deterioration and damage of the Z-phase-signal-detection-target portions, or the like.

According to another aspect, the absolute encoder of the present teaching preferably includes the following configuration. The absolute encoder is provided in a motor. The abnormality detection unit detects the abnormality of the Z-phase signal, based on an electric angle of the motor. For example, the computer can more quickly detect the abnormality by a hall element of the motor that integrally rotate with the absolute encoder and a proximity sensor that reacts at the engaging protrusions of the brake mechanism than a software detects the abnormality of the absolute encoder. Accordingly, the degree of design freedom of a hardware resource of the computer can be increased by reducing a processing load of the computer.

According to another aspect, the absolute encoder of the present teaching includes an AB-phase-signal-detecting unit that detects the AB-phase-signal-detection-target portion and a Z-phase-signal-detecting unit that detects the Z-phase-signal-rise-detection-target portions and the Z-phase-signal-fall-detection-target portions. The AB-phase signal is generated via detection of the AB-phase-signal-detection-target portion by the AB-phase-signal-detecting unit, and the Z-phase signal is generated via detection of the Z-phase-signal-rise-detection-target portions and the Z-phase-signal-fall-detection-target portions by the Z-phase-signal-detecting unit. With the above-described configuration, an error correction function can be realized that corrects an error of the AB-phase signal from a number of pulses of the AB-phase signals generated in an interval from a rise of a signal waveform to a fall of the signal waveform, an interval from the rise of the signal waveform to a rise in an adjacent signal waveform, an interval from the fall or the signal waveform to a fall in an adjacent signal waveform, or an interval from the fall of the signal waveform to another rise in an adjacent waveform, in the plurality of Z-phase signals.

Even when an error that a portion of the AB-phase signal cannot be detected occurs, the absolute encoder can easily presume the AB-phase signal in which the error has occurred by using a difference in an angle range from the Z-phase-signal-rise-detection-target portion to the Z-phase-signal-fall-detection-target portion in the Z-phase-signal-detection-target portion. Thus, the absolute encoder can generate the AB-phase signal and the Z-phase signal from which the rotation angle of the measurement target member can be calculated by a simple configuration, and the degree of design freedom of a hardware resource of the computer can be increased by reducing a processing load of the computer.

According to another aspect, the absolute encoder of the present teaching preferably includes the following configuration. The absolute encoder includes a control device in which, in a case where the restriction ranges of the rotary body are limited by the brake mechanism, the Z-phase-signal-detecting unit detects the Z-phase-signal-rise-detection-target portion and the Z-phase-signal-fall-detection-target portion while the rotary body reciprocatively rotates clockwise and counterclockwise a plurality of times in a range in which the rotary body is rotatable.

In the above-described configuration, the absolute encoder generates at least one Z-phase signal and AB-phase signal while the rotary body the restriction ranges of which are limited is caused to reciprocatively rotate clockwise and counterclockwise a plurality of times. The computer can reliably acquire the number of pulses of the AB-phase signal in the interval defined by a combination of a fall of a signal waveform to a rise of the signal waveform in the Z-phase signal from the absolute encoder. Thus, even when the range in which the measurement target member can rotate is limited by the brake mechanism, the absolute encoder can generate the AB-phase signal and the Z-phase signal from which the rotation angle of the measurement target member can be calculated, by a simple configuration.

According to another aspect, the absolute encoder of the present teaching preferably includes the following configuration. The absolute encoder includes a device that stores values of the number of rotations from an origin determined as a value of a mechanical angle immediately before the power is turned off in a non-volatile memory and reads the stored values from the non-volatile memory immediately after the power is turned on. The absolute encoder includes a function that restricts the rotation by the brake mechanism while the power is off.

In the above-described configuration, the absolute encoder can retain the number of rotations from the determined origin because the rotation of the rotary body is restricted while the power is off. Thus, a multi-turn absolute encoder that can calculate the rotation angle and the number of rotations of the measurement target member can be configured by a simple configuration.

The terminology used herein is for the purpose of describing particular embodiments only and is not intended to be limiting of the invention.

As used herein, the term "and/or" includes any and all combinations of one or more of the associated listed items.

It will be further understood that the terms "including," "comprising" or "having" and variations thereof when used in this specification, specify the presence of stated features, steps, elements, components, and/or their equivalents, but do not preclude the presence or addition of one or more steps, operations, elements, components, and/or groups thereof.

It will be further understood that the terms "mounted," "connected," "coupled," and/or their equivalents thereof are used broadly and encompass both "direct and indirect" mounting, connecting, and coupling. Furthermore, "connected" and "coupled" are not restricted to physical or mechanical connections or couplings, and can include connections or couplings whether direct or indirect.

Unless otherwise defined, all terms (including technical and scientific terms) used herein have the same meaning as commonly understood by one having ordinary skill in the art to which the present invention belongs.

It will be further understood that terms, such as those defined in commonly used dictionaries, should be interpreted as having a meaning that is consistent with their meaning in the context of the relevant art and present disclosure and will not be interpreted in an idealized or overly formal sense unless expressly so defined herein.

In describing the present teaching, it will be understood that a number of techniques and steps are disclosed. Each of these has individual benefit and each can also be used in conjunction with one or more, or in some cases all, of the other disclosed techniques.

Accordingly, for the sake of clarity, this description will refrain from repeating every possible combination of the individual steps in an unnecessary fashion. Nevertheless, the specification and claims should be read with the understanding that such combinations are entirely within the scope of the invention.

Embodiments of an absolute encoder according to the present teaching will be herein described.

In the following description, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

[Multi-Joint Robot Arm]

A multi joint robot arm herein refers to a robot arm including a plurality of joint portions that connect a plurality of links. The multi joint robot arm includes a vertical multi joint robot arm. Specifically, the vertical multi joint robot arm is a robot arm of a serial link mechanism in which links are connected in series from a root to a tip end via rotary joints of one degree of freedom. The vertical multi-joint robot arm includes a plurality of rotary joints.

[Absolute Encoder]

An absolute encoder herein is a device that detects a mechanical rotation position in a motor or a rotation shaft as a rotation angle from a determined origin and converts the detected rotation angle into a signal that can be processed by a computer. Among types of the absolute encoder, a type that can detect the number of rotations from the determined origin as well as the rotation angle is called multi-turn absolute encoder. The absolute encoder detects a mechanical angle during one rotation. On the other hand, in the multi-turn absolute encoder, it is necessary to retain the number of rotations when a main power supply is turned off. Examples of the multi-turn absolute encoder include a multi-turn absolute encoder that, even when a main power supply is turned off, monitors an operation of a detection target body with power supplied from a backup power supply by using the backup power supply configured by a battery or the like separately from the main power supply, a multi-turn absolute encoder that, even when the main power supply is turned off without the backup power supply, monitors an operation of the detection target body with energy generated by a rotary motion, a multi-turn absolute encoder that calculates the number of rotations by the absolute encoder via a speed reducer having a high speed reduction ratio, a multi-turn absolute encoder that retains the number of rotations immediately before the main power supply is turned off in a non-volatile memory and mechanically locks a rotation shaft while the main power supply is off, or the like.

[AB-Phase Signal, Z-Phase Signal]

An AB-phase signal herein is a pulse signal generated in proportion to a rotation amount of a motor or a rotation shaft. The AB-phase signal is a signal obtained by synthesizing an A-phase signal output by an A-phase signal detecting unit and a B-phase signal output by a B-phase-signal-detecting unit. A Z-phase signal is a pulse signal generated in order to set an origin.

[AB-Phase-Signal-Detection-Target Portion]

An AB-phase-signal-detection-target portion herein is a mark (for example, a slit, a reflecting surface, a magnet, or the like) that can be detected by an AB-phase-signal-detecting unit. The AB-phase-signal-detecting unit generates an AB-phase signal that is a pulse signal each time the AB-phase-signal detecting unit detects the AB-phase-signal-detection-target portion. The AB-phase-signal-detection-target portion includes a configuration where a mark detected by the A-phase signal detecting unit and a mark detected by the B-phase signal detecting unit are provided in different positions on one track and a configuration where a mark detected by the A-phase signal detecting unit is provided on one of two tracks and a mark detected by the B-phase signal detecting unit is provided on the other one of the two tracks.
[Z-Phase-Signal-Rise-Detection-Target Portion, Z-Phase-Signal-Fall-Detection-Target Portion]

Each of a Z-phase-signal-rise-detection-target portion and a Z-phase-signal-fall-detection-target portion herein is a mark (for example, a slit, a reflecting surface, a magnet, or the like) that can be detected by a Z-phase-signal-detecting unit. When the Z-phase-signal-detecting unit detects the Z-phase-signal-rise-detection-target portion, the Z-phase-signal-detecting unit turns on a Z-phase signal. When the Z-phase-signal-detecting unit detects the Z-phase-signal-fall-detection-target portion, the Z-phase-signal-detecting unit turns off the Z-phase signal. That is, when the Z-phase-signal-detecting unit detects the Z-phase-signal-rise-detection-target portion, the Z-phase-signal-detecting unit continuously generates Z-phase signals until the Z-phase-signal-detecting unit detects the Z-phase-signal-fall-detection-target portion.
[Mechanical Angle, Electric Angle]

A mechanical angle herein is a rotation angle of a rotating plate. In a case where the mechanical angle is zero, for example, a Z-phase-signal-detection-target portion of the rotating plate is positioned in a detection position of the Z-phase-signal-detecting unit. An electric angle is an angle obtained by multiplying a rotation angle obtained by excluding a stator offset angle and a rotor offset angle from the mechanical angle by the number of pairs of poles. For example, as a rotary body is viewed along an axis line, the stator offset angle is a deviation angle between the Z-phase-signal-detecting unit and a U-phase coil center of a stator. For example, as the rotary body is viewed along the axis line, the rotor offset angle is a deviation angle between a mark generating the Z-phase-signal-detection-target portion that is an origin of the absolute encoder and an N pole magnet center.
[Interval Between AB-Phase-Signal-Detection-Target Portions, Interval Between Z-Phase-Signal-Rise-Detection-Target Portion and Z-Phase-Signal-Fall-Detection-Target Portion that are Adjacent to Each Other]

An interval between AB-phase-signal-detection-target portions herein refers to a rotation angle from a mechanical angle when the AB-phase-signal-detecting unit detects a mark of the AB-phase-signal-detection-target portion to a mechanical angle when the AB-phase-signal-detecting unit detects a mark of the adjacent AB-phase-signal-detection-target portion thereto. An interval between a Z-phase-signal-rise-detection-target portion and a Z-phase-signal-fall-detection-target portion that are adjacent to each other refers to a rotation angle from a mechanical angle when the Z-phase-signal-detecting unit detects the Z-phase-signal-rise-detection-target portion to a mechanical angle when the Z-phase-signal-detecting unit detects the Z-phase-signal-fall-detection-target portion adjacent thereto. An interval between a Z-phase-signal-rise-detection-target portion and a Z-phase-signal-rise-detection-target portion that are adjacent to each other refers to a rotation angle from a mechanical angle when the Z-phase-signal-detecting unit detects the Z-phase-signal-rise-detection-target portion to a mechanical angle when the Z-phase-signal-detecting unit detects the Z-phase-signal-rise-detection-target portion adjacent thereto. An interval between a Z-phase-signal-fall-detection-target portion and a Z-phase-signal-fall-detection-target portion that are adjacent to each other refers to a rotation angle from a mechanical angle when the Z-phase-signal-detecting unit detects the Z-phase-signal-fall-detection-target portion to a mechanical angle when the Z-phase-signal-detecting unit detects the Z-phase-signal-fall-detection-target portion adjacent thereto. Moreover, an interval between a Z-phase-signal-fall-detection-target portion and a Z-phase-signal-rise-detection-target portion that are adjacent to each other refers to a rotation angle from a mechanical angle when the Z-phase-signal-detecting unit detects the Z-phase-signal-fall-detection-target portion to a mechanical angle when the Z-phase-signal-detecting unit detects the Z-phase-signal-rise-detection-target portion adjacent thereto. Note that an interval is defined using as references a moment at which the AB-phase-signal-detecting unit outputs a rise of an AB-phase signal and a moment at which the Z-phase-signal-detecting unit outputs a rise or a fall of a Z-phase signal.
[Abnormality]

An abnormality herein refers to a state that is not normal, that is, for example, a state where the AB-phase-signal-detection-target portion or the Z-phase-signal-detection-target portion does not generate an AB-phase signal or a Z-phase signal at time intervals in accordance with rotation speed of the rotary body.

Advantageous Effects of Invention

One embodiment of the present teaching provides an absolute encoder that, even when a range in which a measurement target member can rotate is limited by a brake mechanism, generates an AB-phase signal and a Z-phase signal from which a rotation angle of the measurement target member can be calculated, by a simple configuration.

BRIEF DESCRIPTION OF DRAWINGS

FIG. 15 is a flowchart illustrating a control mode of detection of an abnormality of an absolute encoder by an actuator according to a fifth embodiment of the present teaching.

DESCRIPTION OF EMBODIMENTS

Figure 1:
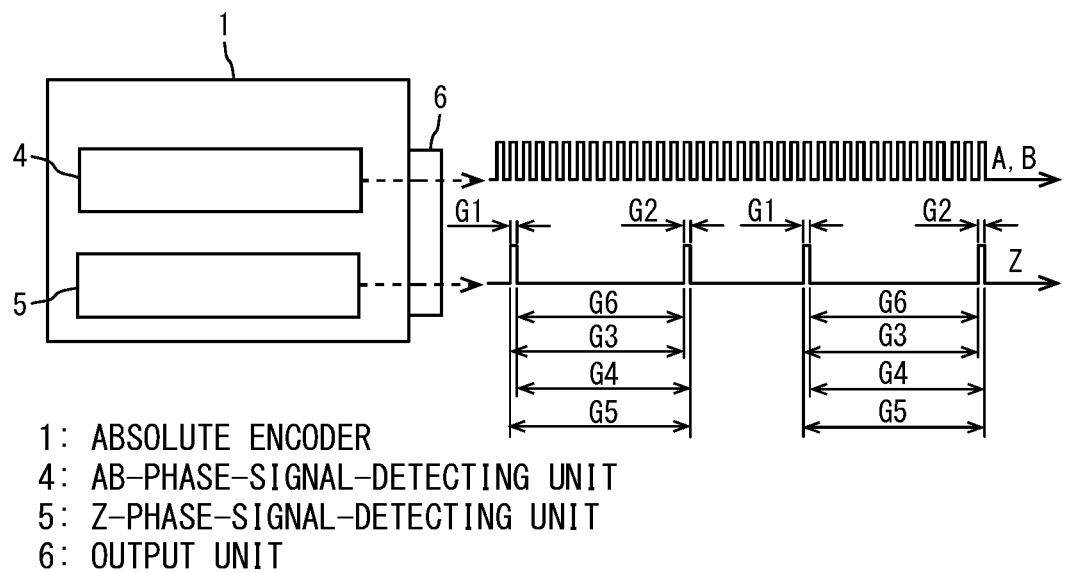
FIG. 1 is a diagram illustrating an entire configuration of an absolute encoder according to a first embodiment of the present teaching.

Embodiments will be described hereinafter with reference to the drawings. In the drawings, the same or corresponding parts are denoted by the same reference numerals, and description thereof will not be repeated. The dimensions of components in the drawings do not strictly represent actual dimensions of the components and dimensional proportions of the components, for example.

First Embodiment

<Entire Configuration of Absolute Encoder>

Figure 2:
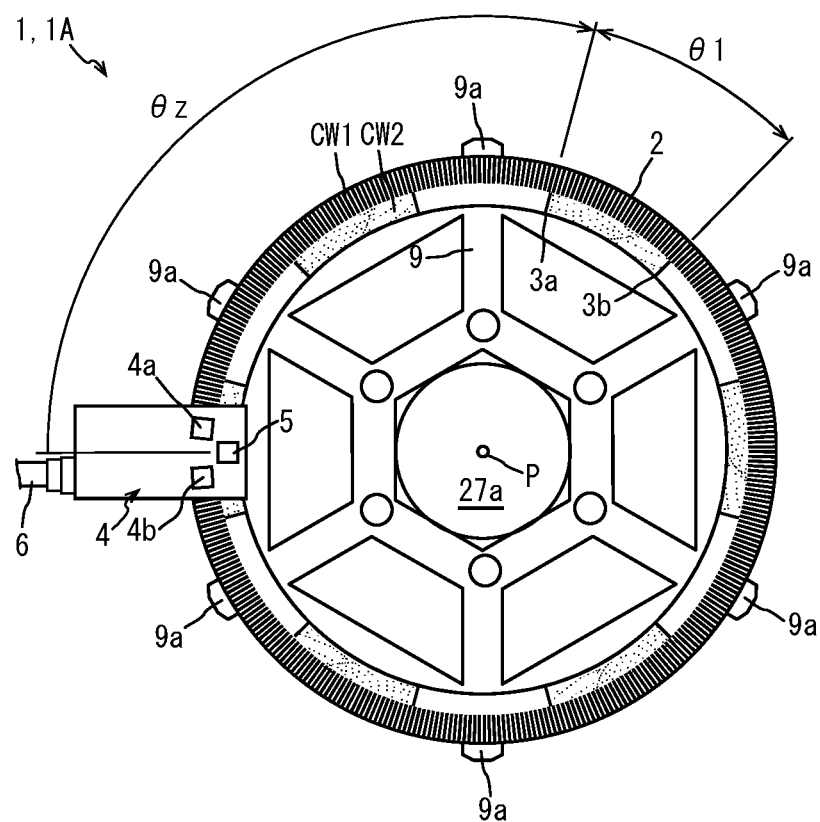
FIG. 2 is a plan view of the absolute encoder according to the first embodiment of the present teaching.
Figure 3:
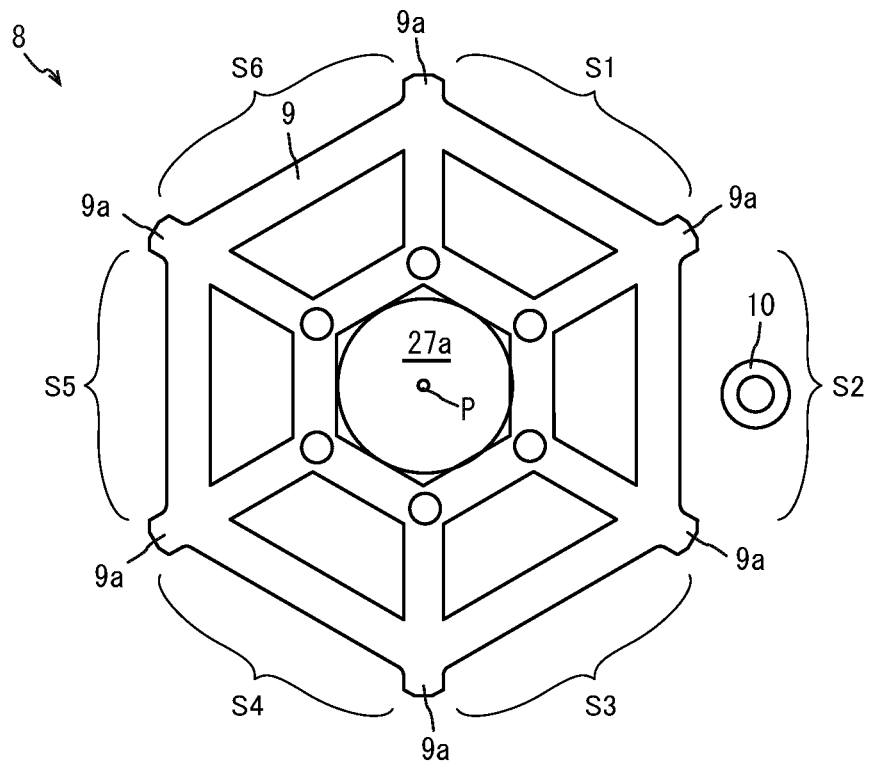
FIG. 3 is a plan view of a brake mechanism according to the first embodiment of the present teaching.
Figure 4:
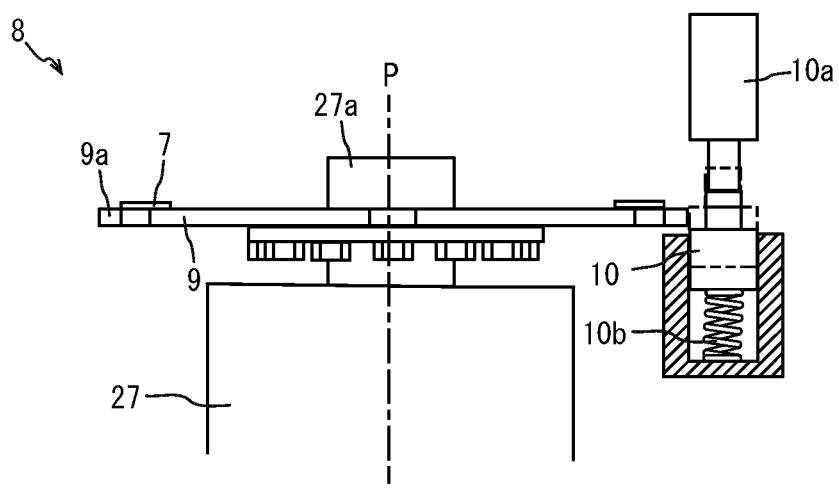
FIG. 4 is a side view of a brake mechanism according to the first embodiment of the present teaching.

With reference to FIG. 1 to FIG. 4, an entire configuration of an absolute encoder 1 according to a first embodiment of the present teaching will be described. FIG. 1 is a schematic diagram illustrating the entire configuration of the absolute encoder 1 according to the first embodiment of the present teaching. FIG. 2 is a plan view illustrating the absolute encoder 1 according to the first embodiment of the present teaching. FIG. 3 is a plan view illustrating a brake mechanism 8 according to the first embodiment of the present teaching. FIG. 4 is a side view illustrating the brake mechanism 8 according to the first embodiment of the present teaching.

As illustrated in FIG. 1, the absolute encoder 1 is a rotary encoder that detects, on a rotation shaft that is a measurement target member, information (the number of pulses of an AB-phase signal in this embodiment) related to an absolute rotation angle in a case where a determined origin is a reference and outputs a detection result thereof. The absolute encoder 1 is, for example, a reflection type optical absolute encoder. The absolute encoder 1 generates an AB-phase signal used for detecting a rotation angle of the measurement target member within a mechanical angle of 360 degrees and a Z-phase signal used for detecting an origin of the mechanical angle of the measurement target member.

As illustrated in FIG. 1 and FIG. 2, the absolute encoder 1 includes an AB-phase-signal-detection-target portion 2 used for generating the AB-phase signal, a Z-phase-signal-detection-target portion 3 used for generating the Z-phase signal, an AB-phase-signal-detecting unit 4 that detects the AB-phase-signal-detection-target portion 2, a Z-phase-signal-detecting unit 5 that detects the Z-phase-signal-detection-target portion 3, an output unit 6 that can output the AB-phase signal and the Z-phase signal to an unillustrated computer that controls a motor 27 (see FIG. 4) that is a measurement target member, and a brake mechanism 8. In this embodiment, the AB-phase-signal-detection-target portion 2 and the Z-phase-signal-detection-target portion 3 are provided on a rotating plate 7 (see FIG. 4) that integrally rotates with a rotation shaft 27a (see FIG. 4) of the motor 27. The rotating plate 7 rotates by 360 degrees by rotation of the rotation shaft 27a of the motor 27 by a mechanical angle of 360 degrees. That is, a rotation angle of the rotating plate 7 and a rotation angle of the rotation shaft 27a of the motor 27 match each other. In the following embodiments, a mechanical angle of the motor 27 will be referred to simply as a mechanical angle.

The AB-phase-signal-detection-target portion 2 is a mark that can be detected by the AB-phase-signal-detecting unit 4. The AB-phase-signal-detection-target portion 2 includes an A-phase signal detection-target portion and a B-phase signal detection-target portion. In this embodiment, in the AB-phase-signal-detection-target portion 2, a reflecting surface and a non-reflecting surface each having an approximately rectangular shape are alternately arranged in a circumferential direction on the rotating plate 7. The AB-phase-signal-detection-target portion 2 reflects detection light output by the AB-phase-signal-detecting unit 4 by the reflecting surface and absorbs the detection light with the non-reflecting surface. The plurality of AB-phase-signal-detection-target portions 2 are annularly and radially arranged. The plurality of AB-phase-signal-detection-target portions 2 have an equal width in the circumferential direction. Moreover, the plurality of AB-phase-signal-detection-target portions 2 are arranged such that angle ranges defined by mechanical angles in accordance with positions of adjacent ones of the AB-phase-signal-detection-target portions 2 are equal. That is, the plurality of AB-phase-signal-detection-target portions 2 are arranged such that intervals in the circumference direction each of which is provided between adjacent ones of the AB-phase-signal-detection-target portions 2 are equal. As described above, the plurality of AB-phase-signal-detection-target portions 2 form an annular AB-phase signal code wheel CW1 in which a plurality of reflecting surfaces having an equal width in the circumferential direction are arranged at equal intervals in the circumference direction. In the AB-phase signal code wheel CW1 formed by the plurality of AB-phase-signal-detection-target portions 2, the reflecting surface and the non-reflecting surface are alternately arranged in the circumferential direction. A center of the AB-phase signal code wheel CW1 matches a rotation axis line P of the rotating plate 7.

The AB-phase-signal-detecting unit 4 includes, for example, an unillustrated light projecting element formed of an LED light emitting element or the like and an unillustrated light receiving element formed of a photodiode or the like. The AB-phase-signal-detecting unit 4 is supported, for example, by a portion that does not rotate in conjunction with the rotation shaft 27a of the motor 27. The AB-phase-signal-detecting unit 4 is provided in a position in which the AB-phase-signal-detecting unit 4 can project light to the AB-phase signal code wheel CW1 and can receive reflection light reflected by the AB-phase signal code wheel CW1. The detection light of the light projecting element is reflected on the reflecting surface that is the AB-phase-signal-detection-target portion 2 and, on the other hand, is absorbed on the non-reflecting surface. The AB-phase-signal-detecting unit 4 outputs the AB-phase signal while the detection light output from the light projecting element is reflected on the reflecting surface and is received by the light receiving element.

The AB-phase-signal-detecting unit 4 does not output the AB-phase signal while the detection light output from the light projecting element is absorbed by the non-reflecting surface and is not received by the light receiving element. The AB-phase-signal-detecting unit 4 includes an A-phase signal detecting unit 4a that outputs an A-phase signal and a B-phase signal detecting unit 4b that outputs a B-phase signal.

For the A-phase signals and the B-phase signals generated by the AB-phase-signal-detection-target portions 2 and the AB-phase-signal-detecting unit 4, an angle range of a mechanical angle that is an interval from a rise of a signal waveform to a fall of the signal waveform is all the same. Moreover, for the A-phase signals and the B-phase signals, an interval between rises of a signal waveform that are adjacent to each other is all the same.

On the other hand, positions of the A-phase signal detecting unit 4a that outputs the A-phase signal and the B-phase signal detecting unit 4b that outputs the B-phase signal relative to the AB-phase-signal-detection-target portions 2 are different. Therefore, phases of signal waveforms of the A-phase signal and the B-phase signal are deviated from each other. Thus, for the A-phase signal and the B-phase signal, a phase difference of signal waveforms differs depending on a rotation direction of the rotation shaft 27a of the motor 27. Accordingly, the absolute encoder 1 can output, as information used for determining the rotation direction of the rotation shaft 27a of the motor 27, a phase difference of the B-phase signal relative to the A-phase signal. The AB-phase-signal-detecting unit 4 outputs an AB-phase signal obtained by synthesizing the A-phase signal output by the A-phase signal detecting unit 4a and the B-phase signal output by the B-phase signal detecting unit 4b.

Widths of the reflecting surfaces in the circumferential direction in the plurality of AB-phase-signal-detection-target portions 2 define the angle range of the mechanical angle of the motor 27 that rotates while the AB-phase-signal-detecting unit 4 outputs the AB-phase signal. An interval between adjacent reflecting surfaces in the circumferential direction in the plurality of AB-phase-signal-detection-target portions 2 defines the angle range of the mechanical angle of the motor 27 that rotates until the AB-phase-signal-detecting unit 4 outputs a next AB-phase signal. The AB-phase-signal-detecting unit 4 outputs the AB-phase signal in accordance with the widths of the reflecting surfaces in the circumference direction and the interval between adjacent reflecting surfaces in the circumferential direction in the plurality of AB-phase-signal-detection-target portions 2. As described above, AB-phase signals can be generated by the plurality of AB-phase-signal-detection-target portions 2 and the AB-phase-signal-detecting unit 4. The generated AB-phase signals have the same signal waveform and the same signal interval.

The Z-phase-signal-detection-target portion 3 is a mark that can be detected by the Z-phase-signal-detecting unit 5. In this embodiment, the Z-phase-signal-detection-target portions 3 are a plurality of substantially rectangular reflecting surfaces provided on the rotating plate 7. The plurality of Z-phase-signal-detection-target portions 3 are arranged in an annular shape. The plurality of Z-phase-signal-detection-target portions 3 are configured of reflecting surfaces with various widths including reflecting surfaces with an equal width in the circumferential direction. Moreover, the plurality of Z-phase-signal-detection-target portions 3 are arranged such that intervals in the circumferential direction that are angle ranges defined by respective mechanical angles are different. The intervals in the plurality of Z-phase-signal-detection-target portions 3 may be partially equal. As described above, the reflecting surfaces with various widths including the reflecting surfaces with the equal width in the circumferential direction are arranged at various intervals including equal intervals in the circumferential direction, and thus, an annular Z-phase signal code wheel CW2 is formed of the plurality of Z-phase-signal-detection-target portions 3. In the Z-phase signal code wheel CW2 formed of the plurality of Z-phase-signal-detection-target portions 3, a reflecting surface (a light black portion in FIG. 2) and a non-reflecting surface are alternately arranged in the circumferential direction. A center of the Z-phase signal code wheel CW2 matches the rotation axis line P of the rotating plate 7. That is, the plurality of Z-phase-signal-detection-target portions 3 and the plurality of AB-phase-signal-detection-target portions 2 are concentrically arranged on the rotating plate 7. Thus, phases of the plurality of Z-phase-signal-detection-target portions 3 are fixed with respect to the plurality of AB-phase-signal-detection-target portions 2.

The Z-phase-signal-detecting unit 5 includes, for example, a light projecting element formed of an LED light emitting element or the like and a light receiving element formed of a photodiode or the like. The Z-phase-signal-detecting unit 5 is supported by the portion that does not rotate in conjunction with the rotation shaft 27a of the motor 27. The Z-phase-signal-detecting unit 5 is provided in a position in which the Z-phase-signal-detecting unit 5 can project light to the Z-phase signal code wheel CW2 and can receive reflection light reflected by the Z-phase signal code wheel CW2. The detection light of the light projecting element is reflected on the reflecting surface that is the Z-phase-signal-detection-target portion 3 and, on the other hand, is absorbed on the non-reflecting surface. The Z-phase-signal-detecting unit 5 outputs Z-phase signals while the detection light output from the light projecting element is reflected on the reflecting surface and is received by the light receiving element. The Z-phase-signal-detecting unit 5 does not output the Z-phase signal while the detection light output from the light projecting element is absorbed by the non-reflecting surface and is not received by the light receiving element.

Each of the plurality of Z-phase-signal-detection-target portions 3 includes a Z-phase-signal-rise-detection-target portion 3a that generates a rise of the Z-phase signal and a Z-phase-signal-fall-detection-target portion 3b that generates a fall of the Z-phase signal. In a case where the rotating plate 7 rotates around the rotation axis line P of the rotating plate 7, the Z-phase-signal-rise-detection-target portion 3a is a portion of the reflecting surface a state of which is changed from a state where the detection light is absorbed by the non-reflecting surface and is not received by the light receiving element of the Z-phase-signal-detecting unit 5 to a state where the detection light is reflected on the reflecting surface and is received by the light receiving element. That is, the Z-phase-signal-rise-detection-target portion 3a is an edge located in a front position in a rotation direction on the reflecting surface as viewed in an axial direction of the rotation axis line P of the rotating plate 7. In a case where the rotating plate 7 rotates around the rotation axis line P of the rotating plate 7, the Z-phase-signal-fall-detection-target portion 3b is a portion of the reflecting surface a state of which is changed from a state where the detection light is reflected on the reflecting surface and is received by the light receiving element of the Z-phase-signal-detecting unit 5 to a state where the detection light is absorbed by the non-reflecting surface and is not received by the light receiving element. That is, the Z-phase-signal-fall-detection-target portion 3b is an edge located in a rear position in the rotation direction on the reflecting surface as viewed in the axial direction of the rotation axis line P of the rotating plate 7. FIG. 2 illustrates the Z-phase-signal-rise-detection-target portion 3a and the Z-phase-signal-fall-detection-target portion 3b in a case where the rotating plate 7 rotates clockwise as viewed in the axial direction of the rotation axis line P.

An interval between the Z-phase-signal-rise-detection-target portion 3a and the Z-phase-signal-fall-detection-target portion 3b that are adjacent to each other is an angle range (see θ1 of FIG. 2) of a mechanical angle defined by a mechanical angle corresponding to the position of the Z-phase-signal-rise-detection-target portion 3a and a mechanical angle corresponding to the position of the Z-phase-signal-fall-detection-target portion 3b. An angle range of a mechanical angle from a rise to a fall of a Z-phase signal is defined by an interval in the circumferential direction from the Z-phase-signal-rise-detection-target portion 3a to the Z-phase-signal-fall-detection-target portion 3b, the Z-phase-signal-rise-detection-target portion 3a and the Z-phase-signal-fall-detection-target portion 3b being adjacent to each other. An angle range of a mechanical angle from a fall of a Z-phase signal to a rise of a next Z-phase signal is defined by an interval in the circumferential direction from the Z-phase-signal-fall-detection-target portion 3b to the Z-phase-signal-rise-detection-target portion 3a, the Z-phase-signal-fall-detection-target portion 3b and the Z-phase-signal-rise-detection-target portion 3a being adjacent to each other. Accordingly, the interval in the circumferential direction from the Z-phase-signal-rise-detection-target portion 3a to the Z-phase-signal-fall-detection-target portion 3b, the Z-phase-signal-rise-detection-target portion 3a and the Z-phase-signal-fall-detection-target portion 3b being adjacent to each other, represents the width of the reflecting surface in the circumferential direction. The interval in the circumferential direction from the Z-phase-signal-fall-detection-target portion 3b to the Z-phase-signal-rise-detection-target portion 3a, the Z-phase-signal-fall-detection-target portion 3b and the Z-phase-signal-rise-detection-target portion 3a being adjacent to each other, represents an interval between adjacent reflecting surfaces in the circumferential direction.

When the Z-phase-signal-detecting unit 5 detects the Z-phase-signal-rise-detection-target portion 3a, the Z-phase-signal-detecting unit 5 starts outputting Z-phase signals. That is, when detection light output from the projecting element is reflected on the reflecting surface and is received by the light receiving element, the Z-phase-signal-detecting unit 5 outputs the Z-phase signals. When the Z-phase-signal-detecting unit 5 detects the Z-phase-signal-fall-detection-target portion 3b, the Z-phase-signal-detecting unit 5 stops outputting the Z-phase signals. That is, when detection light output from the projecting element is absorbed by the non-reflecting surface and is not received by the light receiving element, the Z-phase-signal-detecting unit 5 stops outputting the Z-phase signals. The Z-phase-signal-detecting unit 5 outputs the Z-phase signals in accordance with the width of the reflecting surface in the circumferential direction and the interval between the adjacent reflecting surfaces in the circumferential direction. As described above, the plurality of Z-phase-signal-detection-target portions 3 and the Z-phase-signal-detecting unit 5 can generate the Z-phase signals.

The plurality of Z-phase-signal-detection-target portions 3 are arranged such that the AB-phase-signal-detection-target portions 2 are located between the Z-phase-signal-rise-detection-target portion 3a and the Z-phase-signal-fall-detection-target portion 3b that are adjacent to each other in the circumferential direction. Thus, during a period from when the Z-phase-signal-detecting unit 5 detects the Z-phase-signal-rise-detection-target portion 3a and generates a rise of a Z-phase signal to when the Z-phase-signal-detecting unit 5 detects the Z-phase-signal-fall-detection-target portion 3b and generates a fall of the Z-phase signal, an AB-phase signal is generated by the AB-phase-signal-detection-target portion 2 and the AB-phase-signal-detecting unit 4. That is, the absolute encoder 1 outputs information related to the angle range of the mechanical angle of the motor 27 that rotates during a period from when the Z-phase signal rises to when the Z-phase signal falls in terms of the number of pulses of the AB-phase signal.

The output unit 6 outputs the AB-phase signal generated by the AB-phase-signal-detection-target portion 2 and the AB-phase-signal-detecting unit 4 and the Z-phase signal generated by the Z-phase-signal-detection-target portion 3 and the Z-phase-signal-detecting unit 5 to a driving unit 31 (see FIG. 12) that is a computer that controls the motor 27. The driving unit 31 can acquire information related to a rotation angle within a mechanical angle of 360 degrees using the determined origin as a reference in the rotation shaft 27a of the motor 27. The driving unit 31 can acquire information related to the origin of the rotation shaft 27a of the motor 27 within a mechanical angle of 360 degrees from the Z-phase signal generated by the Z-phase-signal-detection-target portion 3.

(Brake Mechanism)

As illustrated in FIG. 3 and FIG. 4, in a case where an electric current is not supplied to the motor 27 or in a case where the motor 27 does not output a torque, the brake mechanism 8 limits the rotation of the rotation shaft 27a of the motor 27. The brake mechanism 8 includes a rotary body 9, an engaging pin 10, and a solenoid 10a.

The rotary body 9 integrally rotates with the rotation shaft 27a of the motor 27. The rotary body 9 is a member having an approximately disk shape. The rotary body 9 is provided on the rotation shaft 27a. The rotary body 9 is connected to the rotation shaft 27a in a state where a center of the rotary body 9 matches the rotation axis line P of the rotation shaft 27a. That is, the rotary body 9 integrally rotates with the rotation shaft 27a around the rotation axis line P of the rotation shaft 27a.

The rotary body 9 includes at least two engaging protrusions 9a that protrude radially outward in an outer edge portion. The plurality of engaging protrusions 9a are arranged at equal intervals in a circumferential direction of the rotary body 9. In this embodiment, the rotary body 9 includes six engaging protrusions 9a in the circumferential direction every 60 degrees. Thus, the rotary body 9 is divided into a first section S1 to a sixth section S6 in this order in the circumferential direction by the six engaging protrusions 9a.

The engaging pin 10 is a member that restricts rotation of the rotary body 9. The engaging pin 10 is supported by a portion, such as a housing of the motor 27, a housing of a speed reducer 25 (see FIG. 11) of the motor 27, or the like, that does not rotate in conjunction with the rotary body 9. The engaging pin 10 is arranged such that an axis line is parallel to the rotation axis line P of the rotary body 9. The engaging pin 10 is configured to be movable in the axial direction of the axis line.

A position of the engaging pin 10 is changed between a restriction position (indicated by an alternate long and two short dashes line) in which the engaging pin 10 is located in a position in which the engaging pin 10 overlaps one of the engaging protrusions 9a as viewed in a direction orthogonal to the axial direction of the rotation axis line P of the rotary body 9 and an open position (indicated by a solid line) in which the engaging pin 10 is located in a position in which the engaging pin 10 does not overlap any one of the engaging protrusions 9a. A force is applied to the engaging pin 10 in the axis line direction of the engaging pin such that the engaging pin 10 is held in the restriction position by an elastic body 10b, such as a spring or the like. In a case where the engaging pin 10 is located in the restriction position, the engaging pin 10 is positioned in one of the first section S1 to the sixth section S6 into which the rotary body 9 is divided by the adjacent engaging protrusions 9a in the circumferential direction. An interval between the adjacent engaging protrusions 9a in the circumferential direction in the rotary body 9 has a distance in the circumferential direction along which the engaging pin 10 can relatively move in the circumferential direction between the adjacent engaging protrusions 9a in a state where the engaging pin 10 is located in the restriction position. The engaging pin 10 engages with either one of one engaging protrusion 9a and the other engaging protrusion 9a adjacent thereto in the circumferential direction that together form a corresponding section by rotation of the rotary body 9.

The solenoid 10a is an actuator that moves the engaging pin 10. The solenoid 10a is supported by the portion, such as the housing of the motor 27, the housing of the speed reducer 25, or the like, that does not rotate in conjunction with the rotary body 9. The solenoid 10a moves the engaging pin 10 held in the restriction position to the open position in an electrically conducted ON state.

The brake mechanism 8 configured in the above-described manner restricts a rotation range of the rotary body 9 that integrally rotates with the rotation shaft 27a by changing the position of the engaging pin 10 from the open position to the restriction position by the solenoid 10a. The brake mechanism 8 limits the rotation range of the rotary body 9 to an angle range from a position in which the engaging pin 10 contacts one engaging protrusion 9a forming a section to a position in which the engaging pin 10 contacts the other engaging protrusion 9a adjacent thereto in the circumferential direction. That is, the brake mechanism 8 restricts the rotation range of the rotary body 9 to an angle range of any one of the first section S1 to the sixth section S6. A restriction range that is an angle range of each section is defined by each of a mechanical angle of the motor 27 when the engaging pin 10 contacts one engaging protrusion 9a forming the section and a mechanical angle of the motor 27 when the engaging pin 10 contacts the other engaging protrusion 9a adjacent thereto in the circumferential direction. The brake mechanism 8 restricts the rotation range of the rotation shaft 27a of the motor 27 to which the rotary body 9 is connected to a restriction range of each section by restricting the rotation range of the rotary body 9.

The rotating plate 7 including the plurality of AB-phase-signal-detection-target portions 2 and the plurality of Z-phase-signal-detection-target portions 3 is provided on a surface perpendicular to the rotation axis line P of the rotary body 9. The rotating plate 7 is fixed to the rotary body 9 such that the rotation axis line P of the AB-phase signal code wheel CW1 formed by the plurality of AB-phase-signal-detection-target portions 2 and the rotation axis line P of the Z-phase signal code wheel CW2 formed by the plurality of Z-phase-signal-detection-target portions 3, respectively, match the rotation axis line P of the rotary body 9. That is, the AB-phase-signal-detection-target portions 2, the Z-phase-signal-detection-target portions 3, the rotating plate 7, and the rotary body 9 integrally rotate with the rotation axis line P of the rotation shaft 27a of the motor 27 as a center. The plurality of AB-phase-signal-detection-target portions 2 are arranged along the circumferential direction of the rotary body 9 at equal intervals in the circumferential direction. The plurality of Z-phase-signal-detection-target portions 3 are arranged along the circumferential direction of the rotary body 9 at various intervals including equal intervals in the circumferential direction.

(Positional Relationship Between Rotary Body and Absolute Encoder)

Figure 5:
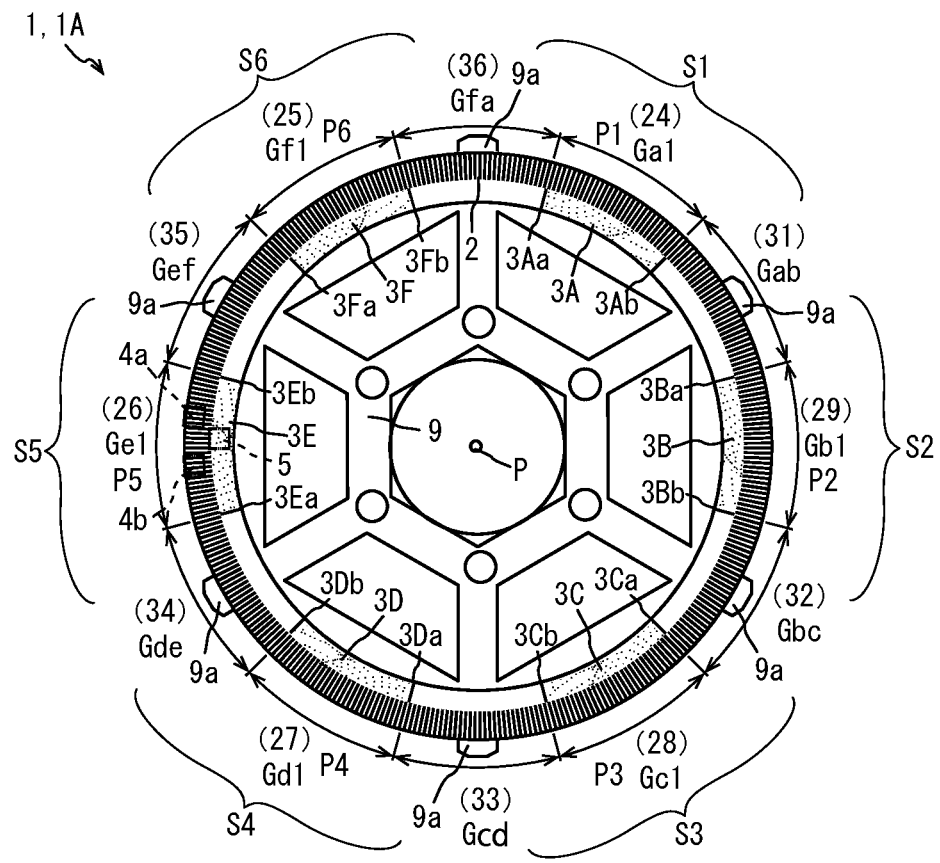
FIG. 5 is a plan view illustrating a positional relationship of AB-phase-signal-detection-target portions, Z-phase-signal-detection-target portions, and a rotary body according to the first embodiment and a third embodiment of the present teaching.
Figure 6:
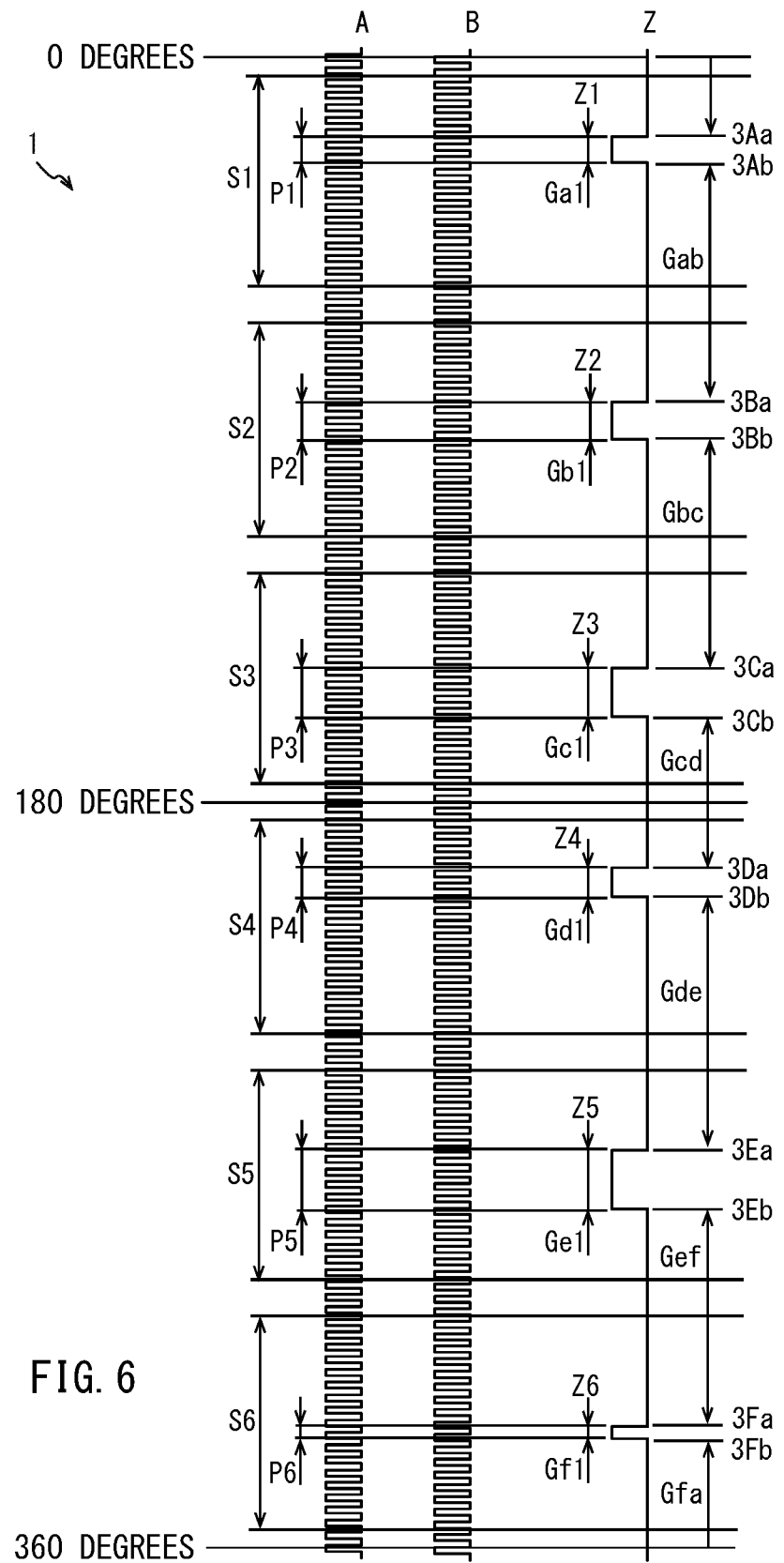
FIG. 6 is a schematic diagram illustrating a signal waveform of an AB-phase signal and a signal waveform of a Z-phase signal according to the first embodiment of the present teaching.

Next, with reference to FIG. 5 and FIG. 6, a positional relationship between the AB-phase-signal-detection-target portions 2 and the Z-phase-signal-detection-target portions 3 of the absolute encoder 1, and the rotary body 9 of the brake mechanism 8 will be described in detail. FIG. 5 is a plan view illustrating a positional relationship between the absolute encoder 1 and the rotary body 9 according to the embodiment of the present teaching. FIG. 6 is a schematic diagram illustrating a signal waveform of the AB-phase signal and a signal waveform of the Z-phase signal according to the embodiment of the present teaching.

The plurality of AB-phase-signal-detection-target portions 2 are arranged such that the edge in the front position in the rotation direction as viewed in the axial direction of the rotation axis line P of the rotary body 9 matches a Z-phase-signal-rise-detection-target portion (for example, a Z-phase-signal-rise-detection-target portion 3Aa). That is, the absolute encoder 1 generates a rise of a Z-phase signal and a rise of an AB-phase signal at the same timing.

As illustrated in FIG. 5, the plurality of AB-phase-signal-detection-target portions 2 are arranged along the circumferential direction of the rotary body 9 at equal intervals within a mechanical angle of 360 degrees. In each of the restriction ranges of the first section S1, the second section S2, the third section S3, the fourth section S4, the fifth section S5, and the sixth section S6 that restrict the rotation range of the rotary body 9, the same number of AB-phase-signal-detection-target portions 2 are positioned.

The plurality of Z-phase-signal-detection-target portions 3 are arranged along the circumferential direction of the rotary body 9 at various intervals including equal intervals in a range of a mechanical angle of 360 degrees. As for the plurality of Z-phase-signal-detection-target portions 3, at least one Z-phase-signal-detection-target portion 3 is positioned in each section that is a restriction range. In this embodiment, in the first section S1, a first Z-phase-signal-detection-target portion 3A is positioned. In the second section S2, a second Z-phase-signal-detection-target portion 3B is positioned. In the third section S3, a third Z-phase-signal-detection-target portion 3C is positioned. In the fourth section S4, a fourth Z-phase-signal-detection-target portion 3D is positioned. In the fifth section S5, a fifth Z-phase-signal-detection-target portion 3E is positioned. In the sixth section S6, a sixth Z-phase-signal-detection-target portion 3F is positioned.

In each section, at least one set of the Z-phase-signal-rise-detection-target portion 3a and the Z-phase-signal-fall-detection-target portion 3b is located. In the first section S1, a first Z-phase-signal-rise-detection-target portion 3Aa and a first Z-phase-signal-fall-detection-target portion 3Ab forming the first Z-phase-signal-detection-target portion 3A are located adjacent to each other in the circumferential direction. The first Z-phase-signal-rise-detection-target portion 3Aa and the first Z-phase-signal-fall-detection-target portion 3Ab are arranged such that a first interval Ga1 is provided in the circumferential direction. The first interval Ga1 is an angle range of a mechanical angle defined by a mechanical angle corresponding to a position of the first Z-phase-signal-rise-detection-target portion 3Aa and a mechanical angle corresponding to a position of the first Z-phase-signal-fall-detection-target portion 3Ab.

In the second section S2, a second Z-phase-signal-rise-detection-target portion 3Ba and a second Z-phase-signal-fall-detection-target portion 3Bb forming the second Z-phase-signal-detection-target portion 3B are located adjacent to each other in the circumferential direction. The second Z-phase-signal-rise-detection-target portion 3Ba and the second Z-phase-signal-fall-detection-target portion 3Bb are arranged such that a second interval Gb1 is provided in the circumferential direction. The second interval Gb1 is an angle range of a mechanical angle defined by a mechanical angle corresponding to a position of the second Z-phase-signal-rise-detection-target portion 3Ba and a mechanical angle corresponding to a position of the second Z-phase-signal-fall-detection-target portion 3Bb.

In the third section S3, a third Z-phase-signal-rise-detection-target portion 3Ca and a third Z-phase-signal-fall-detection-target portion 3Cb forming the third Z-phase-signal-detection-target portion 3C are located adjacent to each other in the circumferential direction. The third Z-phase-signal-rise-detection-target portion 3Ca and the third Z-phase-signal-fall-detection-target portion 3Cb are arranged such that a third interval Gc1 is provided in the circumferential direction. The third interval Gc1 is an angle range of a mechanical angle defined by a mechanical angle corresponding to a position of the third Z-phase-signal-rise-detection-target portion 3Ca and a mechanical angle corresponding to a position of the third Z-phase-signal-fall-detection-target portion 3Cb.

In the fourth section S4, a fourth Z-phase-signal-rise-detection-target portion 3Da and a fourth Z-phase-signal-fall-detection-target portion 3Db forming the fourth Z-phase-signal-detection-target portion 3D are located adjacent to each other in the circumferential direction. The fourth Z-phase-signal-rise-detection-target portion 3Da and the fourth Z-phase-signal-fall-detection-target portion 3Db are arranged such that a fourth interval Gd1 is provided in the circumferential direction. The fourth interval Gd1 is an angle range of a mechanical angle defined by a mechanical angle corresponding to a position of the fourth Z-phase-signal-rise-detection-target portion 3Da and a mechanical angle corresponding to a position of the fourth Z-phase-signal-fall-detection-target portion 3Db.

In the fifth section S5, a fifth Z-phase-signal-rise-detection-target portion 3Ea and a fifth Z-phase-signal-fall-detection-target portion 3Eb forming the fifth Z-phase-signal-detection-target portion 3E are located adjacent to each other in the circumferential direction. The fifth Z-phase-signal-rise-detection-target portion 3Ea and the fifth Z-phase-signal-fall-detection-target portion 3Eb are arranged such that a fifth interval Ge1 is provided in the circumferential direction. The fifth interval Ge1 is an angle range of a mechanical angle defined by a mechanical angle corresponding to a position of the fifth Z-phase-signal-rise-detection-target portion 3Ea and a mechanical angle corresponding to a position of the fifth Z-phase-signal-fall-detection-target portion 3Eb.

In the sixth section S6, a sixth Z-phase-signal-rise-detection-target portion 3Fa and a sixth Z-phase-signal-fall-detection-target portion 3Fb forming the sixth Z-phase-signal-detection-target portion 3F are located adjacent to each other in the circumferential direction. The sixth Z-phase-signal-rise-detection-target portion 3Fa and the sixth Z-phase-signal-fall-detection-target portion 3Fb are arranged such that a sixth interval Gf1 is provided in the circumferential direction. The sixth interval Gf1 is an angle range of a mechanical angle defined by a mechanical angle corresponding to a position of the sixth Z-phase-signal-rise-detection-target portion 3Fa and a mechanical angle corresponding to a position of the sixth Z-phase-signal-fall-detection-target portion 3Fb.

The first interval Ga1 of the first Z-phase-signal-detection-target portion 3A, the second interval Gb1 of the second Z-phase-signal-detection-target portion 3B, the third interval Gc1 of the third Z-phase-signal-detection-target portion 3C, the fourth interval Gd1 of the fourth Z-phase-signal-detection-target portion 3D, the fifth interval Ge1 of the fifth Z-phase-signal-detection-target portion 3E, and the sixth interval Gf1 of the sixth Z-phase-signal-detection-target portion 3F are defined to be different angle ranges from each other.

In the first interval Ga1, P1 pieces of AB-phase-signal-detection-target portions 2 are located. In the second interval Gb1, P2 pieces of AB-phase-signal-detection-target portions 2 are located. In the third interval Gc1, P3 pieces of AB-phase-signal-detection-target portions 2 are located. In the fourth interval Gd1, P4 pieces of AB-phase-signal-detection-target portions 2 are located. In the fifth interval Ge1, P5 pieces of AB-phase-signal-detection-target portions 2 are located. In the sixth interval Gf1, P6 pieces of AB-phase-signal-detection-target portions 2 are located. In each interval, a different number of AB-phase-signal-detection-target portions 2 are located. Accordingly, the number of pulses of the AB-phase signal generated by the AB-phase-signal-detection-target portions 2 in an angle range from a rise of a Z-phase signal to a fall of the Z-phase signal generated by the Z-phase-signal-detection-target portion 3 in each section differs from the numbers of pulses of the AB-phase signals generated in the other sections.

The first Z-phase-signal-fall-detection-target portion 3Ab and the second Z-phase-signal-rise-detection-target portion 3Ba are located adjacent to each other in the circumferential direction. The engaging protrusion 9a that partitions the first section S1 and the second section S2 is located in an angle range defined by the mechanical angle corresponding to the position of the first Z-phase-signal-fall-detection-target portion 3Ab and the mechanical angle corresponding to the position of the second Z-phase-signal-rise-detection-target portion 3Ba. The first Z-phase-signal-fall-detection-target portion 3Ab and the second Z-phase-signal-rise-detection-target portion 3Ba are arranged such that a first-second interval Gab is provided in the circumferential direction.

Similarly, in an angle range defined by the mechanical angle of the second Z-phase-signal-fall-detection-target portion 3Bb and the mechanical angle of the third Z-phase-signal-rise-detection-target portion 3Ca, the engaging protrusion 9a that partitions the second section S2 and the third section S3 is located. The second Z-phase-signal-fall-detection-target portion 3Bb and the third Z-phase-signal-rise-detection-target portion 3Ca are arranged such that a second-third interval Gbc is provided in the circumferential direction.

In an angle range defined by the mechanical angle of the third Z-phase-signal-fall-detection-target portion 3Cb and the mechanical angle of the fourth Z-phase-signal-rise-detection-target portion 3Da, the engaging protrusion 9a that partitions the third section S3 and the fourth section S4 is located. The third Z-phase-signal-fall-detection-target portion 3Cb and the fourth Z-phase-signal-rise-detection-target portion 3Da are arranged such that a third-fourth interval Gcd is provided in the circumferential direction.

In an angle range defined by the mechanical angle of the fourth Z-phase-signal-fall-detection-target portion 3Db and the mechanical angle of the fifth Z-phase-signal-rise-detection-target portion 3Ea, the engaging protrusions 9a that partitions the fourth section S4 and the fifth section S5 is located. The fourth Z-phase-signal-fall-detection-target portion 3Db and the fifth Z-phase-signal-rise-detection-target portion 3Ea are arranged such that a fourth-fifth interval Gde is provided in the circumferential direction.

In an angle range defined by the mechanical angle of the fifth Z-phase-signal-fall-detection-target portion 3Eb and the mechanical angle of the sixth Z-phase-signal-rise-detection-target portion 3Fa, the engaging protrusion 9a that partitions the fifth section S5 and the sixth section S6 is located. The fifth Z-phase-signal-fall-detection-target portion 3Eb and the sixth Z-phase-signal-rise-detection-target portion 3Fa are arranged such that a fifth-sixth interval Gef is provided in the circumferential direction.

In an angle range defined by the mechanical range of the sixth Z-phase-signal-fall-detection-target portion 3Fb and the mechanical angle of the first Z-phase-signal-rise-detection-target portion 3Aa, the engaging protrusion 9a that partitions the sixth section S6 and the first section S1 is located. The sixth Z-phase-signal-fall-detection-target portion 3Fb and the first Z-phase-signal-rise-detection-target portion 3Aa are arranged such that a sixth-first interval Gfa is provided in the circumferential direction.

In a case where the engaging pin 10 is located in any one of the angle ranges of the first-second interval Gab, the second-third interval Gbc, the third-fourth interval Gcd, the fourth-fifth interval Gde, the fifth-sixth interval Gef, and the sixth-first interval Gfa, the rotary body 9 cannot rotate in the circumferential direction in an entire range of each angle range because of contact of the engaging protrusion 9a with the engaging pin 10. Accordingly, the angle ranges of the first-second interval Gab, the second-third interval Gbc, the third-fourth interval Gcd, the fourth-fifth interval Gde, the fifth-sixth interval Gef, and the sixth-first interval Gfa cannot be used for specifying a mechanical angle.

As illustrated in FIG. 6, the absolute encoder 1 generates a first Z-phase signal Z1 by the first Z-phase-signal-detection-target portion 3A in the restriction range of the first section S1 of the rotary body 9. Along with that, the absolute encoder 1 generates P1 pieces of AB-phase signals by the P1 pieces of AB-phase-signal-detection-target portions 2 in the first interval Ga1. The absolute encoder 1 generates a second Z-phase signal Z2 by the second Z-phase-signal-detection-target portion 3B in the range of the second section S2. Along with that, the absolute encoder 1 generates P2 pieces of AB-phase signals by the P2 pieces of AB-phase-signal-detection-target portions 2 in the second interval Gb1. The absolute encoder 1 generates a third Z-phase signal Z3 by the third Z-phase-signal-detection-target portion 3C in the range of the third section S3. Along with that, the absolute encoder 1 generates P3 pieces of AB-phase signals by the P3 pieces of AB-phase-signal-detection-target portions 2 in the third interval Gc1. The absolute encoder 1 generates a fourth Z-phase signal Z4 by the fourth Z-phase-signal-detection-target portion 3D in the range of the fourth section S4. Along with that, the absolute encoder 1 generates P4 pieces of AB-phase signals by the P4 pieces of AB-phase-signal-detection-target portions 2 in the fourth interval Gd1. The absolute encoder 1 generates a fifth Z-phase signal Z5 by the fifth Z-phase-signal-detection-target portion 3E in the range of the fifth section S5. Along with that, the absolute encoder 1 generates P5 pieces of AB-phase signals by the P5 pieces of AB-phase-signal-detection-target portions 2 in the fifth interval Ge1. The absolute encoder 1 generates a sixth Z-phase signal Z6 by the sixth Z-phase-signal-detection-target portion 3F in the range of the sixth section S6. Along with that, the absolute encoder 1 generates P6 pieces of AB-phase signals by the P6 pieces of AB-phase-signal-detection-target portions 2 in the sixth interval Gf1.

(Rotation Angle Detection During Continuous Rotation)

Figure 7:
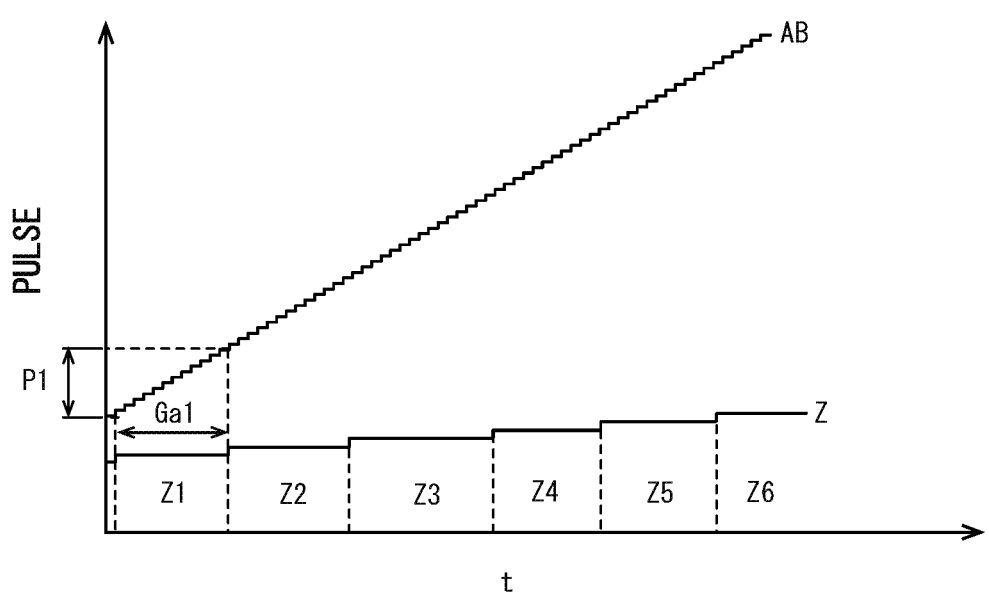
FIG. 7 is a graph illustrating a relationship of the number of pulses of the AB-phase signal in intervals of Z-phase signals according to the first embodiment of the present teaching.
Figure 8:
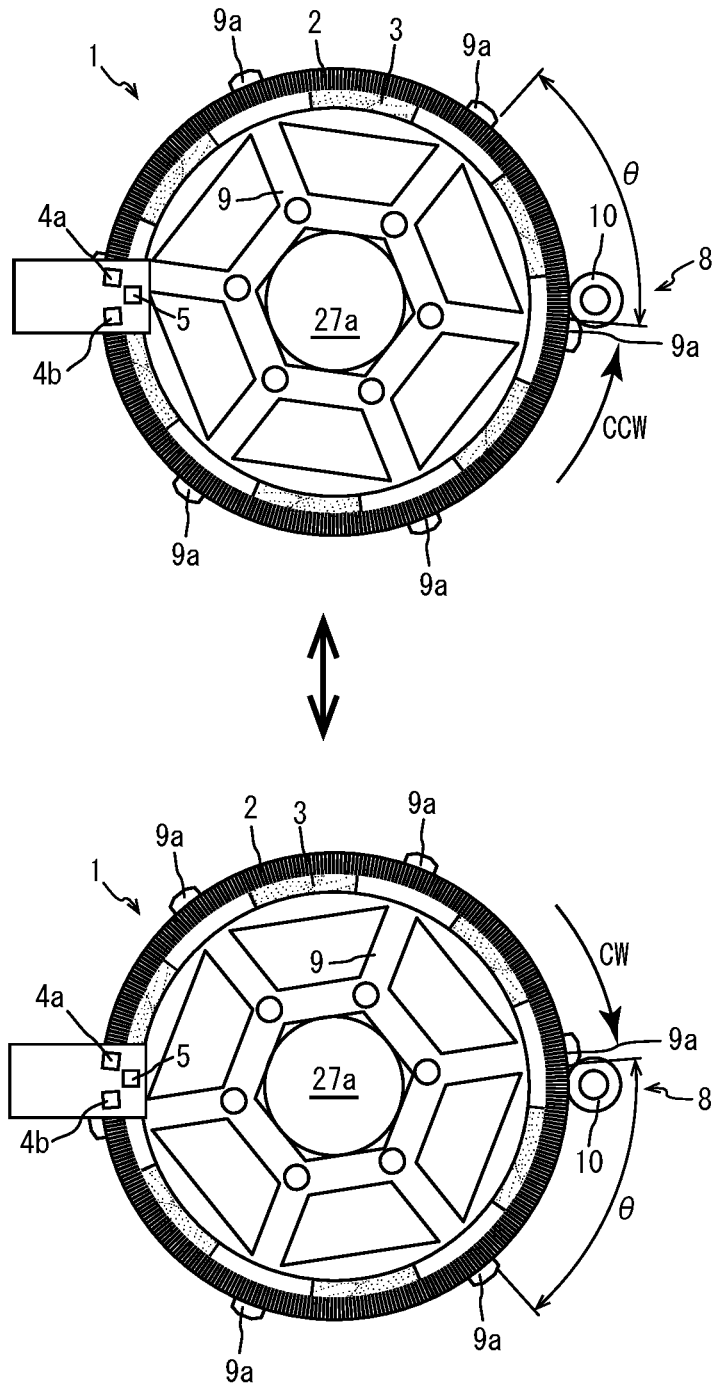
FIG. 8 is a plan view illustrating an operation state when a rotation angle is detected in a state where a rotation range is limited by the brake mechanism according to the first embodiment of the present teaching.
Figure 9:
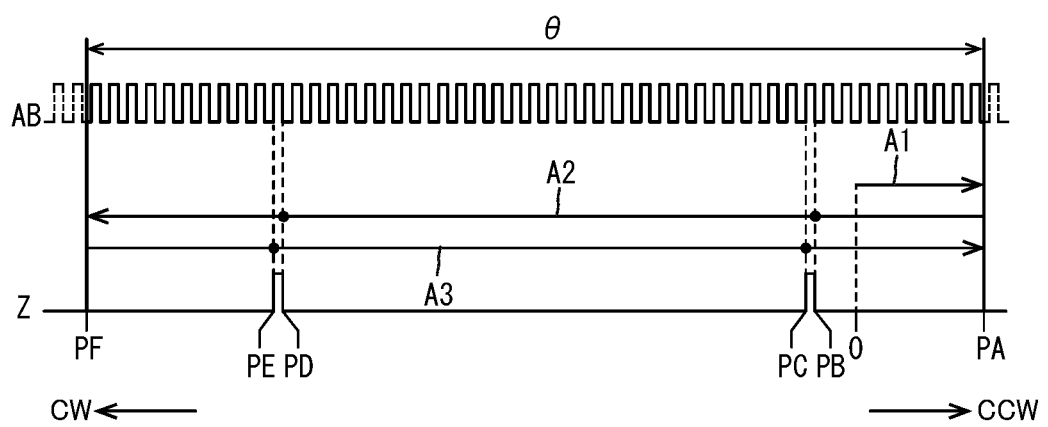
FIG. 9 is a schematic diagram illustrating a relationship between the AB-phase signal and the Z-phase signal detected in a state where the rotation range is limited by the brake mechanism according to the first embodiment of the present teaching.

Next, with reference to FIG. 2 and FIG. 7 to FIG. 9, detection of the rotation angle of the rotation shaft 27a (see FIG. 4) of the motor 27 using the absolute encoder 1 by the driving unit 31 (see FIG. 12) that controls the motor 27 will be described. FIG. 7 is a graph illustrating a relationship of the number of pulses of an AB-phase signal in an interval from a fall of a signal waveform to a rise of the waveform in a Z-phase signal. FIG. 8 is a plan view illustrating an operation state when the rotation angle is detected in a state where the rotation range is limited by the brake mechanism according to the embodiment of the present teaching. FIG. 9 is a schematic diagram illustrating a relationship between the AB-phase signal and the Z-phase signal detected in the state where the rotation range is limited by the brake mechanism according to the embodiment of the present teaching.

As illustrated in FIG. 2, the driving unit 31 stores mechanical angles corresponding to a position of the AB-phase-signal-detecting unit 4 and respective positions of the light projecting element and light receiving element of the Z-phase-signal-detecting unit 5 using the origin of the mechanical angle as a reference. Moreover, the driving unit 31 stores the number P1 of the AB-phase-signal-detection-target portions 2 located in the first interval Ga1, the number P2 of the AB-phase-signal-detection-target portions 2 located in the second interval Gb1, the number P3 of the AB-phase-signal-target-detection-target portions 2 located in the third interval Gc1, the number P4 of the AB-phase-signal-detection-target portions 2 located in the fourth interval Gd1, the number P5 of the AB-phase-signal-detection-target portions 2 located in the fifth interval Ge1, and the number P6 of the AB-phase-signal-detection-target portions 2 located in the sixth interval Gf1 (see FIG. 6). That is, the driving unit 31 stores the number of AB-phase signals generated between a rise and a fall of a Z-phase signal generated by the absolute encoder 1 in each section.

In a case where the rotating plate 7 or the rotary body 9 rotates counterclockwise, the driving unit 31 counts up (adds) the numbers of pulses of an A-phase signal, a B-phase signal, and a Z-phase signal and, in a case where the rotating plate 7 or the rotary body 9 rotates clockwise, the driving unit 31 counts down (subtracts) the numbers of pulses of an AB-phase signal and a Z-phase signal.

As illustrated in FIG. 7, in a case where the motor 27 continuously rotates counterclockwise, the driving unit 31 acquires the AB-phase signal from the absolute encoder 1 and sequentially acquires the first Z-phase signal Z1 to the sixth Z-phase signal Z6. The driving unit 31 counts up the AB-phase signal and the Z-phase signals that have been acquired. The driving unit 31 calculates, for example, the number of pulses of the AB-phase signal acquired during a period from a rise of a signal waveform to a fall of the signal waveform in the first Z-phase signal Z1.

The driving unit 31 determines to which one of the numbers of pulses of the AB-phase signal generated in the first interval Ga1 to the sixth interval Gf1 stored in advance, a pulse P1 that is the calculated number of pulses of the AB-phase signal is equal. When the driving unit 31 determines that the calculated number of pulses of the AB-phase signal is equal to the number of pulses of the AB-phase signal generated in the first interval Ga1, the driving unit 31 specifies the acquired Z-phase signal as the first Z-phase signal Z1.

The driving unit 31 calculates a mechanical angle θz of the rotation shaft 27a in a position corresponding to a position of the Z-phase-signal-detecting unit 5 at a time point where the first Z-phase-signal-rise-detection-target portion 3Aa has generated a rise of the first Z-phase signal Z1 from a mechanical angle of the first Z-phase-signal-rise-detection-target portion 3Aa that has generated the rise of the first Z-phase signal Z1 (see FIG. 2).

The driving unit 31 calculates a rotation angle of the rotation shaft 27a within a mechanical angle of 360 degrees in an actual time by counting the number of pulses of the AB-phase signal from a time point where the rise of the first Z-phase signal Z1 has been acquired.

The driving unit 31 calculates the rotation angle of the rotation shaft 27a within a mechanical angle of 360 degrees on a regular basis, based on the number of pulses of the AB-phase signal acquired during a period from a rise to a fall of the signal waveform in a Z-phase signal sequentially acquired.

(Detection of Rotation Angle at Startup)

As illustrates in FIG. 8, in a case where an electric current is not supplied to the motor 27 (see FIG. 4) or in a case where the motor 27 does not output a torque, a range in which the rotary body 9 can rotate is limited to a restriction range by the engaging pin 10 the position of which has been changed to the restriction position. At this time, the restriction range in which the rotary body 9 can rotate is a range of an angle θ from a mechanical angle at which one engaging protrusion 9a forming a section contacts the engaging pin 10 to a mechanical angle at which the other engaging protrusion 9a forming the same section contacts the engaging pin 10.

In starting supply of an electric current to the motor 27 (see FIG. 4), the driving unit 31 causes the rotation shaft 27a of the motor 27 to rotate alternately counterclockwise (see an arrow CCW) and clockwise (see an arrow CW) in a state where the position of the engaging pin 10 has been changed to the restriction position in order to detect a rotation angle of the rotation shaft 27a (see FIG. 4) of the motor 27. At this time, the driving unit 31 resets the number of pulses of the AB-phase signal acquired in past to zero, and then, causes the rotation shaft 27a to rotate counterclockwise and clockwise. When the driving unit 31 determines that the engaging protrusion 9a of the rotary body 9 has contacted the engaging pin 10 from an output electric current value, a rotation angle, or the like, the driving unit 31 causes the rotation shaft 27a of the motor 27 to rotate in an opposite direction. The driving unit 31 reverses the rotation direction of the rotation shaft 27a of the motor 27 each time the driving unit 31 detects a contact of the engaging protrusion 9a of the rotary body 9 with the engaging pin 10 in the section of the rotary body 9.

While generating the AB-phase signal and the Z-phase signal in accordance with the rotation of the rotation shaft 27a in a counterclockwise direction and in a clockwise direction, the absolute encoder 1 transmits the AB-phase signal and the Z-phase signal to the driving unit 31.

The driving unit 31 calculates the number of acquired pulses of the AB-phase signal. The driving unit 31 counts up the number of pulses of the AB-phase signal during counterclockwise rotation and counts down the number of pulses of the AB-phase signal during clockwise rotation.

As illustrated in FIG. 8 and FIG. 9, the driving unit 31 acquires the number of pulses of the AB-phase signal generated during a period from a rise to a fall of a signal waveform in a Z phase signal by causing the rotation shaft 27a to rotate a plurality of times in the counterclockwise direction (CCW) and in the clockwise (CW) direction.

For example, in a case where two sets of the Z-phase-signal-rise-detection-target portion 3a and the Z-phase-signal-fall-detection-target portion 3b are located in a section of the rotary body 9, the driving unit 31 makes the number of pulses of the AB-phase signal at an arbitrary rotation angle in an arbitrary section zero and causes the rotation shaft 27a of the motor 27 to rotate counterclockwise until the engaging pin 10 located in the restriction position contacts one engaging protrusion 9a forming the section of the rotary body 9 (see the arrow CCW in FIG. 8, an arrow A1 of FIG. 9). The driving unit 31 counts up the number of pulses of the AB-phase signal that is generated. When the driving unit 31 detects a contact of the one engaging protrusion 9a of the rotary body 9 with the engaging pin 10, the driving unit 31 stops the rotation shaft 27a of the motor 27. At the same time, the driving unit 31 stops counting up of the AB-phase signal at a time point of pulse PA.

Next, the driving unit 31 causes the rotation shaft 27a of the motor 27 to rotate clockwise until the engaging pin 10 contacts the other engaging protrusion 9a forming the same section (see the arrow CW of FIG. 8, the arrow A2 of FIG. 9). The driving unit 31 counts down from the pulse PA in accordance with pulses of the AB-phase signal that is generated. When the driving unit 31 acquires a rise of the signal waveform of the Z-phase signal, the driving unit 31 stores a pulse PB and a pulse PD as the number of rising pulses. When the driving unit 31 detects a contact of the other engaging protrusion 9a of the rotary body 9 with the engaging pin 10, the driving unit 31 stops the rotation shaft 27a of the motor 27. At the same time, the driving unit 31 stops counting down of the AB-phase signal at a time point of a pulse PF.

Next, the driving unit 31 causes the motor 27 to rotate counterclockwise until the engaging pin 10 contacts the one engaging protrusion 9a of the rotary body 9 (see the arrow CCW of FIG. 8, an arrow A3 of FIG. 9). The driving unit 31 counts up from the pulse PF in accordance with pulses of the AB-phase signal that is generated. When the driving unit 31 acquires the Z-phase signal, the driving unit 31 stores a pulse PE and a pulse PC as the number of rising pulses. When the driving unit 31 detects a contact of the one engaging protrusion 9a of the rotary body 9 with the engaging pin 10, the driving unit 31 stops the rotation shaft 27a of the motor 27. At this time, the driving unit 31 stops counting up of the AB-phase signal at a time point of the pulse PA.

The driving unit 31 calculates an average value of the stored pulse PB that is a maximum value of the number of rising pulses and the stored pulse PE that is a minimum value of the number of rising pulses. Next, the driving unit 31 calculates a difference between the pulse PD that is a largest number of rising pulses among the numbers of rising pulses that are smaller than the average value of the pulse PB and the pulse PE, and the pulse PC that is a smallest number of rising pulses among the numbers of rising pulses that are larger than the average value of the pulse PB and the pulse PE.

The driving unit 31 determines to which one of the numbers of pulses of the AB-phase signal generated in the first interval Ga1 to the sixth interval Gf1 of the Z-phase signal stored in advance, the calculated difference in the number of rising pulses is equal. The driving unit 31 specifies a section of the rotary body 9 in which the engaging pin 10 held in the restriction position is located, from the interval determined as an interval in which the AB-phase signal of an equal number of pulses is generated.

The brake mechanism 8 of the absolute encoder 1 configured in the above-described manner includes the rotary body 9 including at least the two engaging protrusions 9a. The rotation range of the rotation shaft 27a of the motor 27 when power is off is limited to an angle range that is less than a mechanical angle of 180 degrees at most by the brake mechanism 8. Even when, in a case where the power of the absolute encoder 1 is off, the rotation shaft 27a of the motor 27 rotates, the absolute encoder 1 outputs the AB-phase signal and the Z-phase signal used for specifying the rotation angle within a range that is less than a mechanical angle of 180 degrees to the driving unit 31. The rotation range of the rotation shaft 27a of the motor 27 is less than 180 degrees. Accordingly, the driving unit 31 can uniquely calculate the rotation angle and the number of rotations from a determined origin of the rotation shaft 27a of the motor 27. In a case where the rotation range of the rotation shaft 27a of the motor 27 is limited by the rotary body 9 including six engaging protrusions 9a, the rotation range of the rotation shaft 27a of the motor 27 is limited to a rotation angle that is less than a mechanical angle of 180 degrees even in a state where adjacent two engaging protrusions 9a of the engaging protrusions 9a do not contact the engaging pin 10 because of abrasion or the like of the engaging protrusions 9a. Thus, a multi-turn absolute encoder that can calculate the rotation angle and the number of rotations of the rotation shaft 27a of the motor 27 by a simple structure can be configured.

A known gray code encoder or magnetic type encoder functions as an absolute encoder even in a static state immediately after power is tuned on and can detect a mechanical angle of a detection target member of the motor 27. However, in the gray code encoder or the magnetic type encoder, an amount of calculation performed to specify the mechanical angle is large, and therefore, a dedicated IC is necessary. An ABZ type encoder employing an M sequence as a Z-phase signal does not function as an absolute encoder in a static state immediately after power is turned on, but can be made to function as an absolute encoder by performing a rotation movement in a limit range limited by a brake mechanism or the like. That is, the ABZ type encoder employing the M sequence is made to be able to detect a mechanical angle of the detection target member. However, the ABZ type encoder employing the M sequence has a high volatility of interrupt frequency, and therefore, a dedicated IC configured in accordance with a peak load is needed. On the other hand, in the absolute encoder 1 in this embodiment, at least one set of the Z-phase-signal-rise-detection-target portion 3a and the Z-phase-signal-fall-detection-target portion 3b is located in a restriction range of each section in the rotary body 9. An interval in the circumferential direction between the Z-phase-signal-rise-detection-target portion 3a and the Z-phase-signal-fall-detection-target portion 3b in each section differs from the intervals in all the other sections. Thus, the absolute encoder 1 calculates the number of pulses of the AB-phase signal generated by the AB-phase-signal-detection-target portion 2 during a period from a rise to a fall of a signal waveform of the Z-phase signal in each section of the rotary body 9, and thus, specifies a mechanical angle in the section. Accordingly, the absolute encoder 1 has a lower calculation load than that of a known absolute encoder and a dedicated IC is not required.

Moreover, the first-second interval Gab, the second-third interval Gbc, the third-fourth interval Gcd, the fourth-fifth interval Gde, the fifth-sixth interval Gef, and the sixth-first interval Gfa, each of which is an interval between the Z-phase-signal-fall-detection-target portion 3b and the Z-phase-signal-rise-detection-target portion 3a with each of the engaging protrusions 9a interposed therebetween, may include intervals having the same angle range. Thus, a variation in intervals in the circumferential direction defined by combinations of the Z-phase-signal-rise-detection-target portion 3a and the Z-phase-signal-fall-detection-target portion 3b is reduced. Accordingly, each processing of acquiring a rotation angle within a mechanical angle of 360 degrees can be leveled out, so that a peak load of processing of the driving unit that specifies the rotation angle of the rotation shaft 27a of the motor 27 can be reduced. In general, a computer used for executing real time control is required to have a performance with which the computer does not lose a real time property even at a peak load. Accordingly, performance requirement of the computer can be simplified by reducing the peak load.

The rotation range of the motor 27 is limited to any one of the first section S1 to the sixth section S6 by the brake mechanism 8. The driving unit 31 causes the motor 27 to reciprocatively rotate clockwise and counterclockwise a plurality of times in the restriction range of any one of the sections. The AB-phase-signal-detection-target portion 2 and the Z-phase-signal-detection-target portion 3 pass the restriction range in accordance with the section a plurality of times, and thus, the driving unit 31 can reliably acquire the number of pulses of the AB-phase signal generated during a period from a rise to a fall in a signal waveform of the Z-phase signal. Thus, even when the rotation range of the rotation shaft 27a of the motor 27 is limited by the brake mechanism 8, the AB-phase signal and the Z-phase signal, from which the rotation angle of the rotation shaft 27a of the motor 27 can be calculated, can be generated by a simple configuration. Moreover, a degree of design freedom of a hardware resource of the driving unit 31 can be increased by reducing a processing load of the driving unit 31.

The plurality of AB-phase-signal-detection-target portions 2, the plurality of Z-phase-signal-rise-detection-target portions 3a, and the plurality of Z-phase-signal-fall-detection-target portions 3b are provided on the rotating plate 7 that integrally rotates with the rotary body 9 or the rotary body 9. Accordingly, the AB-phase-signal-detection-target portions 2 and the Z-phase-signal-detection-target portions 3 are integrally provided on the rotation shaft 27a of the motor 27 or the rotary body 9 of the brake mechanism 8 in a state where respective phases of the AB-phase-signal-detection-target portions 2 and the Z-phase-signal-detection-target portions 3 are fixed. Thus, even when a range in which the rotation shaft 27a of the motor 27 can rotate is limited by the brake mechanism 8, the AB-phase signal and the Z-phase signal, from which the rotation angle of the rotation shaft 27a of the motor 27 can be calculated, can be generated by a simple configuration.

The driving unit 31 specifies a section in which the engaging pin 10 held in the restriction position is located, from the number of pulses of the AB-phase signal that has been acquired. Thus, even immediately after startup, that is, when the motor 27 does not output sufficient torques, accuracy in position detection of the rotary body 9 is increased. Accordingly, the degree of design freedom of the hardware resource of the driving unit 31 can be increased by reducing the processing load of the driving unit 31.

Second Embodiment

<Multi-Joint-Robot-Arm Device>

Figure 10:
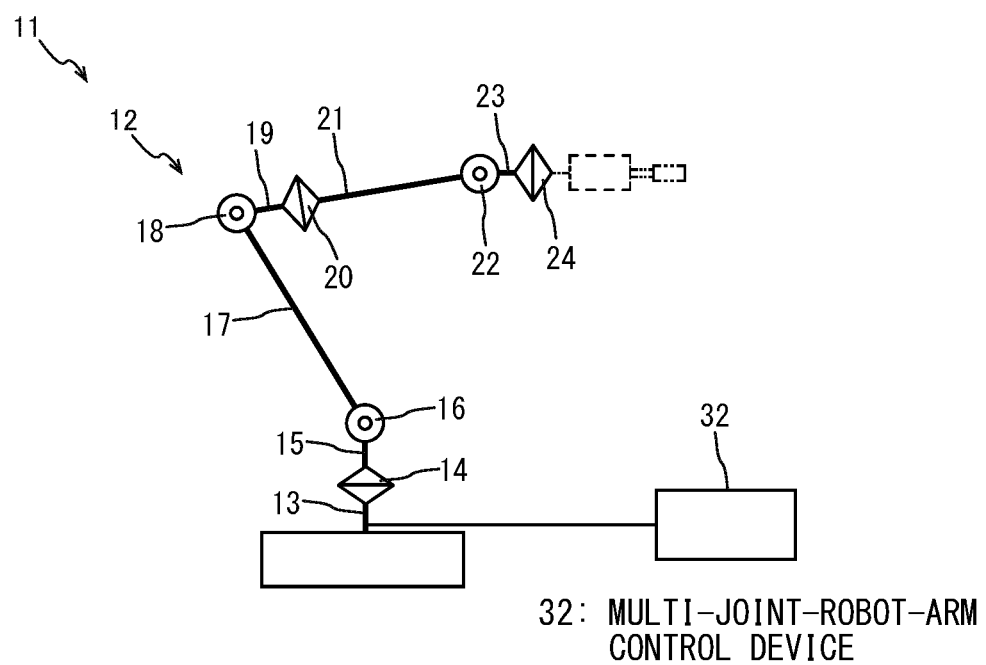
FIG. 10 is a schematic diagram of a multi-joint-robot-arm device according to a second embodiment of the present teaching.
Figure 11:
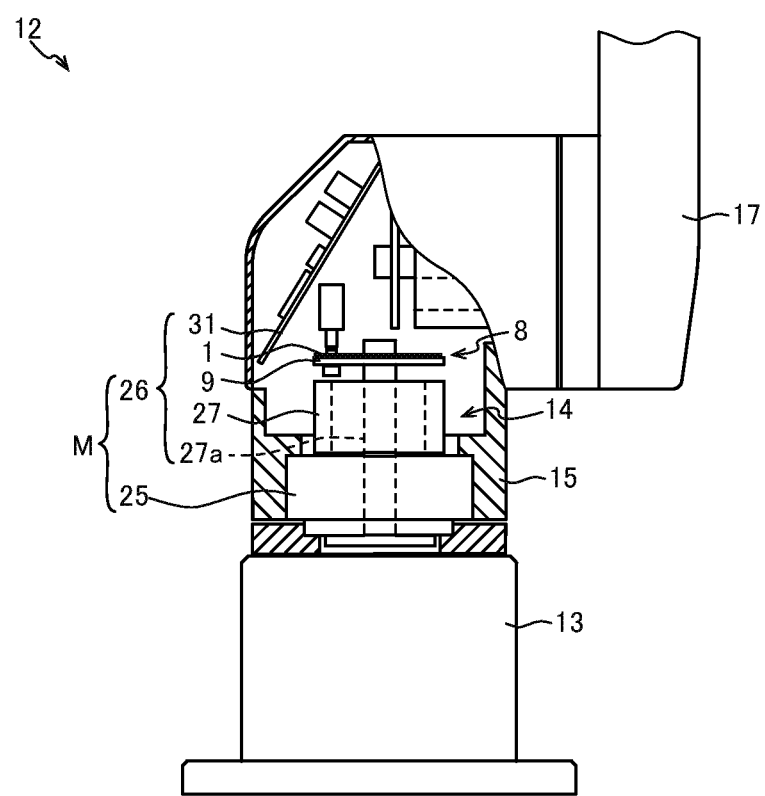
FIG. 11 is a schematic diagram of a motor unit at a base end pertaining to the multi joint robot arm according to the second embodiment of the present teaching.
Figure 12:
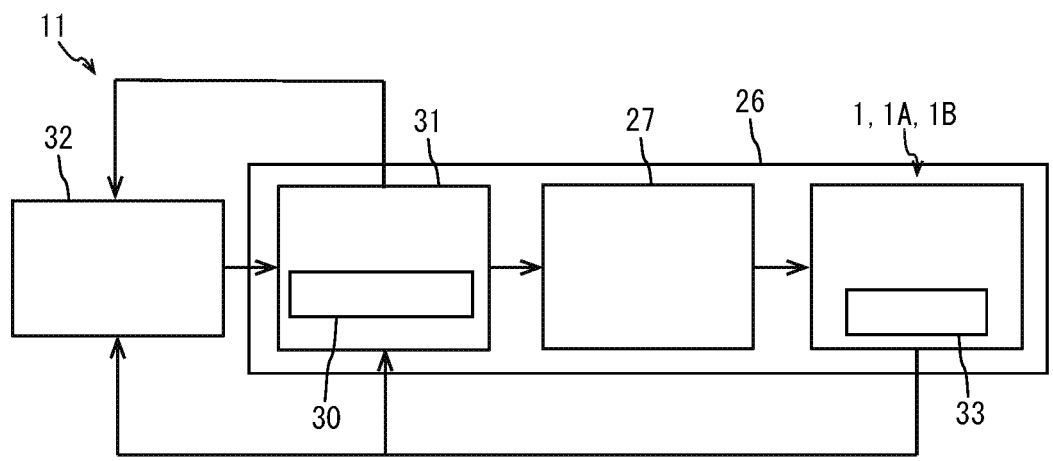
FIG. 12 is a control block diagram of the multi-joint-robot-arm device according to the second embodiment of the present teaching.

With reference to FIG. 10 to FIG. 12, an entire configuration of a multijoint-robot-arm device 11 according to a second embodiment of the present teaching will be described. The Multi-joint-robot-arm device 11 includes the above-described absolute encoder 1. Note that, in the following embodiment, specific description of similar points to those in the embodiment already described will be omitted and only a portion which differs from the already described embodiment will be described in detail.

FIG. 10 is a schematic diagram of the multi-joint-robot-arm device 11 according to the embodiment of the present teaching. FIG. 11 is a schematic diagram of an S-axis rotary joint 14 pertaining to a multi joint robot arm 12 according to the embodiment of the present teaching. FIG. 12 is a control block diagram of the multi-joint-robot-arm device 11 according to the second embodiment of the present teaching.

(Multi-Joint Robot Arm)

As illustrated in FIG. 10, the Multi-joint-robot-arm device 11 includes the multi-joint robot arm 12 and a multi-joint-robot-arm control device 32. In this embodiment, the multi joint robot arm 12 is a robot arm of a serial link mechanism in which links are connected in series from a base end to a tip end via rotary joints of one degree of freedom. The multi joint robot arm 12 is, for example, a six-axis vertical multi joint robot arm. The multi joint robot arm 12 is provided, for example, on a base of a manufacturing device or a remote operation vehicle that can be remotely operated.

In the multi joint robot arm 12, an S-axis rotary joint 14, an L-axis rotary joint 16, a U-axis rotary joint 18, an R-axis rotary joint 20, a B-axis rotary joint 22, and a T-axis rotary joint 24 are connected in series in this order from a base end portion via cases and links. Each axis is configured to be rotatable by a motor unit M. Each of the S-axis rotary joint 14, the L-axis rotary joint 16, the U-axis rotary joint 18, the R-axis rotary joint 20, the B-axis rotary joint 22, and the T-axis rotary joint 24 includes the motor unit M.

The motor unit M includes the speed reducer 25 and an actuator 26. The multi joint robot arm 12 is controlled by the multi-joint-robot-arm control device 32. The multi joint robot arm 12 acquires a control signal output from the multi-joint-robot-arm control device 32 by the driving unit 31 included in the actuator 26 of each axis. The multi joint robot arm 12 transmits, to the multi-joint-robot-arm control device 32, information related to an output of the motor 27 and information output from the absolute encoder 1, of the motor unit M of each axis.

As illustrated in FIG. 11, the S-axis rotary joint 14 is a rotary joint that turns the entire multi joint robot arm 12. The S-axis rotary joint 14 is provided in a case 15 for S and L axes of the multi joint robot arm 12. A base member 13 is fixed to an output shaft of the S-axis rotary joint 14. The base member 13 is fixed to an installation surface of the multi-joint robot arm 12. The S-axis rotary joint 14 is arranged such that an axis line of the S-axis rotary joint 14 extends in a direction perpendicular to the installation surface of the multi-joint robot arm 12.

As illustrated in FIG. 10, the L-axis rotary joint 16 is a rotary joint that causes a lower arm link 17 to swing. The L-axis rotary joint 16 is provided in the case 15 for S and L axes. The L-axis rotary joint 16 is arranged such that an axis line of the L-axis rotary joint 16 extends in a direction perpendicular to the axis line of the S-axis rotary joint 14. One end portion of the lower arm link 17 is fixed to an output shaft of the L-axis rotary joint 16.

The U-axis rotary joint 18 is a rotary joint that causes an upper arm link 21 to swing. The U-axis rotary joint 18 is provided in a case 19 for U and R axes of the multi-joint robot arm 12. An output shaft of the U-axis rotary joint 18 is fixed to the other end portion of the lower arm link 17. The U-axis rotary joint 18 is arranged such that an axis line of the U-axis rotary joint 18 extends in a direction parallel to the axis line of the L-axis rotary joint 16.

The R-axis rotary joint 20 is a rotary joint that causes the upper arm link 21 to rotate. The R-axis rotary joint 20 is provided in the case 19 for U and R axes. The R-axis rotary joint 20 is arranged such that an axis line of the R-axis rotary joint 20 extends in a direction perpendicular to the axis line of the U-axis rotary joint 18. One end portion of the upper arm link 21 is fixed to an output shaft of the R-axis rotary joint 20.

The B-axis rotary joint 22 is a rotary joint that causes the T-axis rotary joint 24 to swing. The B-axis rotary joint 22 is provided in a case 23 for B and T axes of the multi-joint robot arm 12. An output shaft of the B-axis rotary joint 22 is fixed to the other end portion of the upper arm link 21. The B-axis rotary joint 22 is arranged such that an axis line of the B-axis rotary joint 22 extends in a direction perpendicular to the axis line of the R-axis rotary joint 20.

The T-axis rotary joint 24 is a rotary joint that causes an unillustrated end effector to rotate. The T-axis rotary joint 24 is provided in the case 23 for B and T axes. The T-axis rotary joint 24 is arranged such that an axis line of the T-axis rotary joint 24 extends in a direction perpendicular to the axis line of the B-axis rotary joint 22. An output shaft of the T-axis rotary joint 24 includes an end effector attachment portion.

The multi joint robot arm 12 configured in the above-described manner has three translational degrees of freedom in an X shaft, a Y shaft, and a Z shaft and three rotational degrees of freedom around the X axis, the Y axis, and the Z axis, that is, six degrees of freedom in total, by the motor unit M of each axis. Accordingly, the multi joint robot arm 12 can move the output shaft of the T-axis rotary joint 24 to an arbitrary position and also can be made to have an arbitrary posture in a movable space of the multi-joint robot arm 12.

(Motor Unit)

As illustrated in FIG. 10 and FIG. 11, each of the motor units M of the S-axis, the L-axis, the U-axis, the R-axis, the B-axis, and the T-axis is a driving unit that causes the output shaft to rotate in accordance with a control signal from the multi-joint-robot-arm control device 32. The motor unit M of each axis includes the speed reducer 25 and the actuator 26. That is, as for the motor units M, the speed reducer 25, the motor 27, the absolute encoder 1 including the brake mechanism 8, and the driving unit 31 that is a computer that controls the motor 27 are arranged in a corresponding one of the case 15, the case 19 (see FIG. 10), and the case 23 (see FIG. 10) of the multi-joint robot arm 12. The motor units M of the axes have the same configuration, and therefore, the S-axis rotary joint 14 will be described below.

As illustrated in FIG. 11, the speed reducer 25 of the S-axis rotary joint 14 causes the output shaft to rotate in a state where rotation speed of the output shaft is decelerated with respect to rotation speed of an input shaft and generates, as an output torque of the output shaft, an output torque inversely proportional to the deceleration. The speed reducer 25 is provided in the case 15 of the multi-joint robot arm 12. A housing of the speed reducer 25 is fixed to inside of the case 15 of the multi-joint robot arm 12. An output shaft of the speed reducer 25 is fixed to the base member 13.

The actuator 26 of the S-axis rotary joint 14 includes the speed reducer 25, the motor 27, the absolute encoder 1, and the driving unit 31. The S-axis rotary joint 14 is provided in the case 15 of the multi joint robot arm 12. That is, the speed reducer 25, the motor 27, the absolute encoder 1 including the brake mechanism 8, and the driving unit 31 are arranged in the case 15 of the multi joint robot arm 12.

The motor 27 included in the actuator 26 is a power generation source. In this embodiment, the motor 27 is a so-called inner rotor motor 27 in which a rotor is arranged so as to be rotatable in a cylindrical stator. The rotation shaft 27a extending along a shaft center is fixed to the rotor in a state where the rotation shaft 27a passes therethrough in an axial direction. The motor 27 is fixed to one end portion to which power is input in a case of the speed reducer 25. One end portion of the rotation shaft 27a is connected to an input shaft of the speed reducer 25 as an output shaft of the motor 27.

The absolute encoder 1 included in the actuator 26 detects a rotation angle of the rotation shaft 27a in the motor 27 within a mechanical angle of 360 degrees. The absolute encoder 1 transmits the AB-phase signal used for detecting a rotation angle within a mechanical angle of 360 degrees and the Z-phase signal used for detecting an origin of the mechanical angle to the driving unit 31 and the multi-joint-robot-arm control device 32 (see FIG. 10). The absolute encoder 1 is provided in the other end portion of the rotation shaft 27a in the motor 27. That is, the absolute encoder 1 including the brake mechanism 8 is provided on the rotation shaft 27a of the motor 27.

The brake mechanism 8 included in the absolute encoder 1 restricts the rotation of the rotation shaft 27a in the motor 27. In this embodiment, the brake mechanism 8 is provided in the other end portion of the rotation shaft 27a. The brake mechanism 8 limits rotation of the rotation shaft 27a of the motor 27 by mechanical engagement. The brake mechanism 8 may be provided in the one end portion of the rotation shaft 27a.

The driving unit 31 included in the actuator 26 controls a drive electric current supplied to the motor 27. The driving unit 31 is, for example, a computer. The driving unit 31 is provided in the case 15 of the multi joint robot arm 12. The driving unit 31 supplies the motor 27 with an electric current in accordance with the control signal from the multi-joint-robot-arm control device 32. The driving unit 31 acquires the AB-phase signal and the Z-phase signal of the absolute encoder 1 as feedback pulses. The driving unit 31 controls the motor 27 by feedback control in which an electric current in accordance with a difference of a feedback pulse with respect to a command pulse is supplied to the motor 27 (see FIG. 12).

In the S-axis rotary joint 14 configured in the above-described manner, the speed reducer 25, and the motor 27 and the absolute encoder 1 that are provided in the actuator 26 are integrally configured. The motor unit M is configured as an electromechanical integrated configuration in which the speed reducer 25, the actuator 26, and the driving unit 31 are arranged in the case 15 of the multi joint robot arm 12. In the S-axis rotary joint 14, the output shaft of the speed reducer 25 rotates due to rotation of the motor 27, and thus, the case 15 and the actuator 26, of the multi joint robot arm 12, are caused to integrally rotate.

As illustrated in FIG. 12, the multi-joint-robot-arm control device 32 is a device that controls the multi joint robot arm 12. The multi-joint-robot-arm control device 32 may be substantially configured such that a CPU, a ROM, a RAM, a HDD, and the like are connected via a bus and, alternatively, may be configured of a one-chip LSI or the like. Various types of programs or data are stored in the multi-joint-robot-arm control device 32 in order to control an operation of the multi-joint robot arm 12.

The multi-joint-robot-arm control device 32 is connected to each of the driving units 31 included in the S-axis rotary joint 14, the L-axis rotary joint 16, the U-axis rotary joint 18, the R-axis rotary joint 20, the B-axis rotary joint 22, and the T-axis rotary joint 24. The multi-joint-robot-arm control device 32 can transmit a control signal to the driving unit 31 of each axis. Moreover, the multi-joint-robot-arm control device 32 can acquire rotation position information of the motor 27 from the motor unit M of each axis.

The driving unit 31 to which the above-described absolute encoder 1 is connected stores the number of pulses of the AB-phase signal generated during a period from a fall to a rise of a signal waveform in the Z-phase signals. Accordingly, the driving unit 31 counts the number of pulses and the phases of the AB-phase signal generated in the period from a fall to a rise of a signal waveform in the Z-phase signals, and thus, can specify the rotation angle of the rotation shaft 27a within a mechanical angle of 360 degrees. Thus, the driving unit 31 can easily and highly accurately perform processing of acquiring the rotation angle of the rotation shaft 27a of the motor 27 without adding an IC dedicated to an encoder. Accordingly, even when a range in which the motor can rotate is limited by the brake mechanism 8, the AB-phase signal and the Z-phase signal, from which the rotation angle of the rotation shaft 27a of the motor 27 can be calculated, can be generated by a simple configuration.

Third Embodiment

<Other Variation in Interval of Z-Phase Signals)

Figure 13:
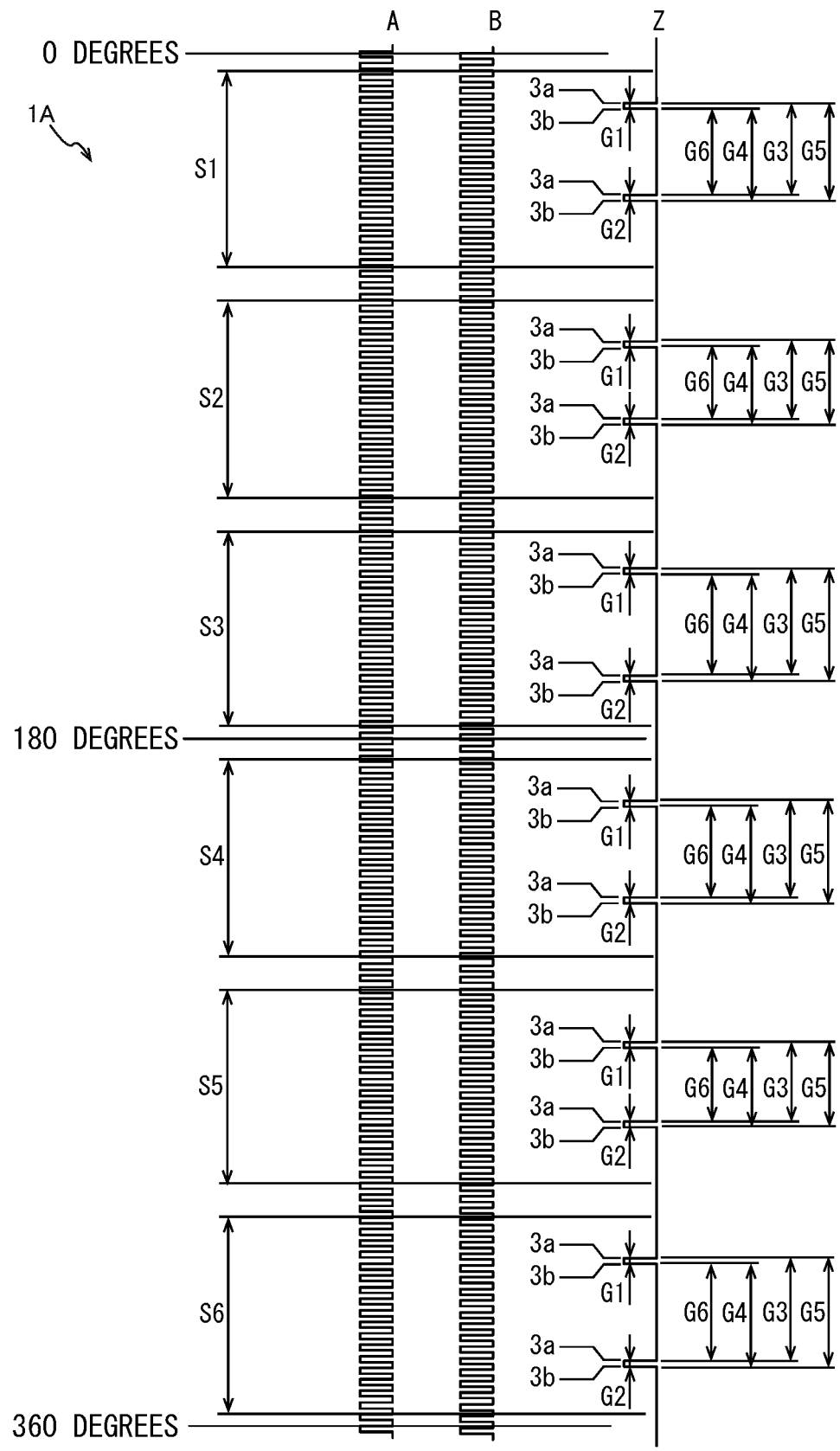
FIG. 13 is a schematic diagram illustrating a signal waveform of an AB-phase signal and a signal waveform of a Z-phase signal according to a third embodiment of the present teaching.

With reference to FIG. 5 and FIG. 13, an absolute encoder 1A according to a third embodiment of the present teaching will be described below. FIG. 13 is a schematic diagram illustrating a signal waveform of an AB-phase signal and a signal waveform of a Z-phase signal according to the third embodiment of the present teaching. In this embodiment, two Z-phase-signal-detection-target portions 3 are positioned in an angle range of each section of the rotary body 9. The two Z-phase-signal-detection-target portions 3 are adjacent to each other in a circumferential direction. The Z-phase-signal-rise-detection-target portion 3a and the Z-phase-signal-fall-detection-target portion 3b of each of the Z-phase-signal-detection-target portions 3 are adjacent to each other in the circumferential direction.

As illustrated in FIG. 13, intervals G1, each of which is an interval in the circumferential direction between the Z-phase-signal-rise-detection-target portion 3a and the Z-phase-signal-fall-detection-target portion 3b of one Z-phase-signal-detection-target portion 3 in each section, are the same among the sections, and intervals G2, each of which is an interval in the circumferential direction between the Z-phase-signal-rise-detection-target portion 3a and the Z-phase-signal-fall-detection-target portion 3b of the other Z-phase-signal-detection-target portion 3 in each section, are the same among the sections. Intervals G3, each of which is an interval in the circumferential direction between the Z-phase-signal-rise-detection-target portion 3a of one Z-phase-signal-detection-target portion 3 and the Z-phase-signal-rise-detection-target portion 3a of the other Z-phase-signal-detection-target portion 3 in each section, are mutually different among the sections. Intervals G4, each of which is an interval in the circumferential direction between the Z-phase-signal-fall-detection-target portion 3b of one Z-phase-signal-detection-target portion 3 and the Z-phase-signal-fall-detection-target portion 3b of the other Z-phase-signal-detection-target portion 3 in each section, are mutually different among the sections. Intervals G5, each of which is an interval in the circumferential direction between the Z-phase-signal-rise-detection-target portion 3a of one Z-phase-signal-detection-target portion 3 and the Z-phase-signal-fall-detection-target portion 3b of the other Z-phase-signal-detection-target portion 3 in each section, are mutually different among the sections. Intervals G6, each of which is an interval in the circumferential direction between the Z-phase-signal-fall-detection-target portion 3b of one Z-phase-signal-detection-target portion 3 and the Z-phase-signal-rise-detection-target portion 3a of the other Z-phase-signal-detection-target portion 3 in each section, are mutually different among the sections.

The absolute encoder 1A configured in the above-described manner is arranged such that the AB-phase-signal-detection-target portions 2 are located between the Z-phase-signal-rise-detection-target portion 3a and the Z-phase-signal-fall-detection-target portion 3b that are adjacent to each other in the circumferential direction. The absolute encoder 1A generates the Z-phase signal having a smaller number of pulses (for example, twelve pulses) than the number of pulses (for example, 360 pulses) of the AB-phase signal generated in rotation of a mechanical angle of 360 degrees. Accordingly, the interval G1, the interval G2, the interval G3, the interval G4, the interval G5, and the interval G6 can be expressed by the number of pulses of the AB-phase signal.

The absolute encoder 1A generates the AB-phase signals having the same number of pulses in angle ranges defined by the intervals G1 in all the sections, and generates the AB-phase signals having the same number of pulses in angle ranges defined by the intervals G2 in all the sections. In an angle range defined by the interval G3 in each section, the absolute encoder 1A generates the AB-phase signal having a different number of pulses from the numbers of pulses in the intervals G3 in all the other sections. Similarly, in an angle range defined by the interval G4 in each section, the absolute encoder 1A generates the AB-phase signal having a different number of pulses from the numbers of pulses in the intervals G4 in all the other sections. Similarly, in an angle range defined by the interval G5 in each section, the absolute encoder 1A generates the AB-phase signal having a different number of pulses from the numbers of pulses in the intervals G5 in all the other sections. Similarly, in an angle range defined by the interval G6 in each section, the absolute encoder 1A generates the AB-phase signal having a different number of pulses from the numbers of pulses in the intervals G6 in all the other sections.

At this time, the Z-phase-signal-detection-target portions 3 satisfies at least one of the following conditions in each of the restriction ranges of the respective sections.

The Z-phase-signal-rise-detection-target portion 3a and the Z-phase-signal-rise-detection-target portion 3a in each section are located in a limit range of each section so as to be in a predetermined interval using, as a reference, a median of the numbers of pulses of the AB-phase signal each of which is generated in an angle range of the interval G3 of each section. Specifically, the Z-phase-signal-rise-detection-target portion 3a and the Z-phase-signal-fall-detection-target portion 3b in each section are located such that a difference between the median of the numbers of pulses of the AB-phase signal each of which is generated in the angle range of the interval G3 of each section and a minimum value, and a difference between the median and a maximum value, respectively, are smaller than a half of the median.

Alternatively, the Z-phase-signal-fall-detection-target portion 3b and the Z-phase-signal-fall-detection-target portion 3b in each section are located in a limit range of each section so as to be in a predetermined interval using, as a reference, a median of the numbers of pulses of the AB-phase signal each of which is generated in an angle range of the interval G4 of each section. Specifically, the Z-phase-signal-fall-detection-target portion 3b and the Z-phase-signal-fall-detection-target portion 3b in each section are located such that a difference between the median of the numbers of pulses of the AB-phase signal each of which is generated in the angle range of the interval G4 of each section and a minimum value, and a difference between the median and a maximum value, respectively, are smaller than the half of the median.

As another option, the Z-phase-signal-rise-detection-target portion 3a and the Z-phase-signal-fall-detection-target portion 3b in each section are located in a limit range of each section so as to be in a predetermined interval using, as a reference, a median of the numbers of pulses of the AB-phase signal each of which is generated in an angle range of the interval G5 of each section. Specifically, the Z-phase-signal-rise-detection-target portion 3a and the Z-phase-signal-fall-detection-target portion 3b in each section are located such that a difference between the median of the numbers of pulses of the AB-phase signal each of which is generated in the angle range of the interval G5 in each section and a minimum value, and a difference between the median and a maximum value, respectively, are smaller than the half of the median.

As still another option, the Z-phase-signal-fall-detection-target portion 3b and the Z-phase-signal-rise-detection-target portion 3a in each section are located in a limit range of each section so as to be in a predetermined interval using, as a reference, a median of the numbers of pulses of the AB-phase signal each of which is generated in an angle range of the interval G6 of each section. Specifically, the Z-phase-signal-fall-detection-target portion 3b and the Z-phase-signal-rise-detection-target portion 3a in each section are located such that a difference between the median of the numbers of pulses of the AB-phase signal each of which is generated in the angle range of the interval G6 in each section and a minimum value, and a difference between the median and a maximum value, respectively, are smaller than the half of the median.

For example, the absolute encoder 1A generates 24 pulses of the AB-phase signal in the angle range of the interval G3 in the first section S1.

Similarly, the absolute encoder 1A generates 29 pulses of the AB-phase signal in the angle range of the interval G3 in the second section S2. The absolute encoder 1A generates 28 pulses of the AB-phase signal in the angle range of the interval G3 in the third section S3. The absolute encoder 1A generates 27 pulses of the AB-phase signal in the angle range of the interval G3 in the fourth section S4. The absolute encoder 1A generates 26 pulses of the AB-phase signal in the angle range of the interval G3 in the fifth section S5. The absolute encoder 1A generates 25 pulses of the AB-phase signal in the angle range of the interval G3 in the sixth section S6.

The median of the number of pulses of the AB phase signal generated in the angle range of the interval G3 for each section described above is 26.5. The minimum value of the number of pulses of the AB phase signal generated in the angle range of the interval G3 for each section is 24. The maximum value of the number of pulses of the AB phase signal generated in the angle range of the interval G3 of each section is 29.

The Z-phase-signal-detection-target portions 3 of each section are configured such that a difference between 26.5 that is the median of the number of pulses of the AB phase signal generated in the angle range of the interval G3 and 24 that is the minimum value is 2.5. The Z-phase-signal-detection-target portions 3 of each section are configured such that 26.5 that is the median of the number of pulses of the AB-phase signal generated in the angle range of the interval G3 and the maximum value is 2.5. Accordingly, the Z-phase-signal-detection-target portions 3 in each section are configured such that each of the difference between the median and the minimum value and the difference between the median and the maximum value is smaller than 13.25 that is the half of the median.

In the Z-phase-signal-detection-target portions 3, at least one interval of the interval G3, the interval G4, the interval G5, or the interval G6 defined by a combination of the Z-phase-signal-rise-detection-target portion 3a and the Z-phase-signal-fall-detection-target portion 3b in each of the restriction ranges of the rotary body 9 limited by adjacent engaging protrusions 9a, is different from the corresponding interval in every other restriction range, with variation of a predetermined range. That is, the Z-phase-signal-rise-detection-target portion 3a and the Z-phase-signal-fall-detection-target portion 3b are located such that at least one of the interval G3, the interval G4, the interval G5, or the interval G6 that is an interval in the circumferential direction defined by a combination of the Z-phase-signal-rise-detection-target portion 3a and the Z-phase-signal-fall-detection-target portion 3b that are adjacent to each other in each restriction range, is substantially equal to, but different from, the corresponding interval in every other restriction range.

<Modification of Third Embodiment>

As another embodiment of the third embodiment, the Z-phase-signal-detection-target portions 3 of the absolute encoder 1A may be configured such that, in each of the restriction ranges of the respective sections, the following conditions are further satisfied.

The Z-phase-signal-rise-detection-target portion 3a and the Z-phase-signal-rise-detection-target portion 3a in each section are located such that the difference between the maximum value and the minimum value in the numbers of pulses of the AB-phase signals each of which is generated in the angle range of the interval G3 of each section is smaller than the half of the median in the numbers of pulses of the AB-phase signals each of which is generated in the angle range of the interval G3 of each section.

The Z-phase-signal-fall-detection-target portion 3b and the Z-phase-signal-fall-detection-target portion 3b in each section are located such that the difference between the maximum value and the minimum value in the numbers of pulses of the AB-phase signals each of which is generated in the angle range of the interval G4 of each section is smaller than the half of the median in the numbers of pulses of the AB-phase signals each of which is generated in the angle range of the interval G4 of each section.

The Z-phase-signal-rise-detection-target portion 3a and the Z-phase-signal-fall-detection-target portion 3b in each section are located such that the difference between the maximum value and the minimum value in the numbers of pulses of the AB-phase signals each of which is generated in the angle range of the interval G5 of each section is smaller than the half of the median in the numbers of pulses of the AB-phase signals each of which is generated in the angle range of the interval G5 of each section.

The Z-phase-signal-fall-detection-target portion 3b and the Z-phase-signal-rise-detection-target portion 3a in each section are located such that the difference between the maximum value and the minimum value in the number of pulses of the AB-phase signals each of which is generated in the angle range of the interval G6 of each section is smaller than the half of the median in the number of pulses of the AB-phase signals each of which is generated in the angle range of the interval G6 of each section.

For example, the Z-phase-signal-detection-target portions 3 of each section are located such that 5 pulses that is a difference between the maximum value 29 and the minimum value 24 of the numbers of pulses of the AB-phase signals each of which is generated in the angle range of the interval G3 is smaller than 13.25 that is a half of 26.5 that is the median.

As described above, in the absolute encoder 1A, at least one interval of the interval G1, the interval G2, the interval G3, the interval G4, the interval G5, or the interval G6 defined by two Z-phase-signal-detection-target portions 3 positioned in each section is different from the corresponding interval in every other section. Moreover, the number of pulses of the AB-phase signal generated in an angle range of at least one interval of the intervals defined by the two Z-phase-signal-detection-target portions 3 in each section differs from the number of pulses of the AB-phase signal generated in the corresponding interval in every other section. Accordingly, the absolute encoder 1A of the third embodiment can achieve similar effects to those of the absolute encoder 1 of the first embodiment.

The absolute encoder 1A is configured such that a variation in each of the numbers of pulses of the AB-phase signals generated in the angle ranges of the interval G3, the interval G4, the interval G5, and the interval G6 that are intervals in the circumferential direction defined by combinations of the Z-phase-signal-rise-detection-target portion 3a and the Z-phase-signal-fall-detection-target portion 3b in each section is within a certain range among the sections, the certain range being determined by using, as a reference, the median of the numbers of pulses of the AB-phase signals each generated in the angle range of each interval in each section. That is, the absolute encoder 1A generates the Z-phase signals such that an interval defined by a combination of a rise and a fall of a Z-phase signal that are adjacent to each other in each section is substantially equal to but different from the corresponding intervals in all of the other sections. Thus, even when the rotation range of the rotation shaft 27a of the motor 27 is limited by the brake mechanism 8, the absolute encoder 1A can generate the AB-phase signal and the Z-phase signal, from which the rotation angle of the rotation shaft 27a of the motor 27 can calculate, by a simple configuration.

The absolute encoder 1A can generate the Z-phase signals at time intervals of a predetermined time or more using the median of the number of pulses of the AB-phase signal as a reference at certain rotation speed. Thus, the degree of design freedom of a hardware resource of the driving unit 31 can be increased by reducing the processing load of the driving unit 31.

In a case where an interval defined by a combination of the Z-phase-signal-rise-detection-target portion 3a and the Z-phase-signal-fall-detection-target portion 3b in each section is different from the corresponding intervals in all of the other sections, that is, in a case where waveforms of the Z-phase signals are mutually different among the sections, opportunities of detection of an absolute position during one rotation of the absolute encoder 1A can be increased by causing interruption processing to occur in both of a rise and a fall of one Z-phase signal. On the other hand, the driving unit 31 can suppress a calculation load by causing interruption processing to occur in one of a rise or a fall of the one Z-phase signal.

Fourth Embodiment

<Correction Unit>

Figure 14:
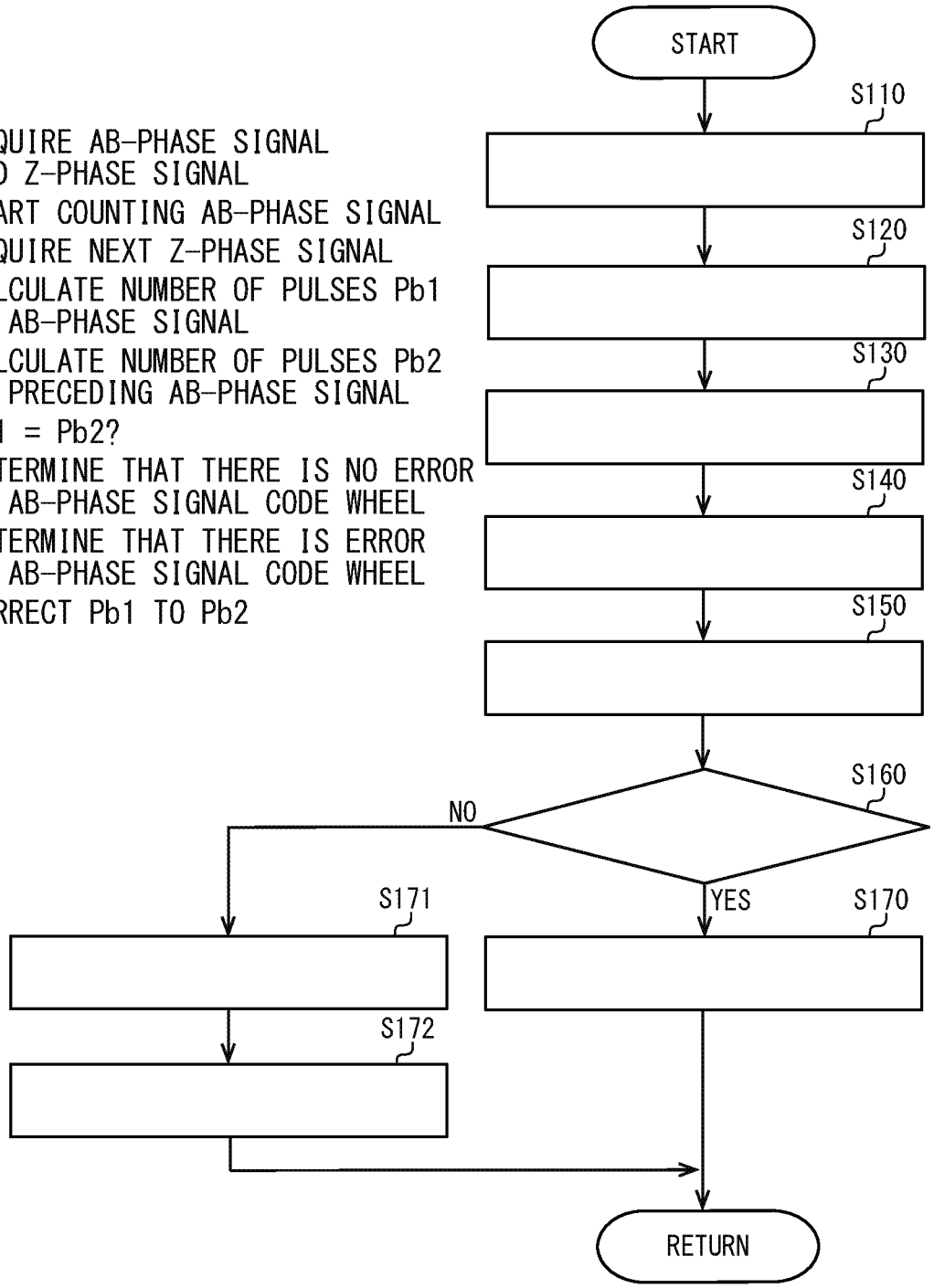
FIG. 14 is a flowchart illustrating a control mode of error correction by an absolute encoder according to a fourth embodiment of the present teaching.

With reference to FIG. 12 and FIG. 14, an absolute encoder 1B according to a fourth embodiment of the present teaching will be described below. FIG. 14 is a flowchart illustrating a control mode of error correction by the absolute encoder 1B according to the fourth embodiment of the present teaching.

As illustrated in FIG. 12, each of the absolute encoders 1, 1A and 1B may include a correction unit 33 that corrects an error of the AB-phase signal.

In a case were a portion of the AB-phase signal cannot be generated, the correction unit 33 of the absolute encoder 1B corrects the rotation angle of the rotation shaft 27a within a mechanical angle of 360 degrees. The correction unit 33 is provided in the absolute encoder 1B. The correction unit 33 stores all of the numbers of pulses of the AB-phase signals generated in the angle ranges of the interval G1, the interval G2, the interval G3, the interval G4, the interval G5, and the interval G6 that are intervals in the circumferential direction defined by combinations of the Z-phase-signal-rise-detection-target portion 3a and the Z-phase-signal-fall-detection-target portion 3b in each section (see FIG. 13).

As illustrated in FIG. 14, the correction unit 33 acquires the AB-phase signal and the Z-phase signal from the AB-phase-signal-detecting unit 4 and the Z-phase-signal-detecting unit 5 (Step S110). Furthermore, the correction unit 33 starts counting up (integration) of the number of pulses of the AB-phase signal (Step S120).

When the correction unit 33 acquires a next Z-phase signal (Step S130), the correction unit 33 calculates the number of pulses Pb1 of the AB-phase signal acquired during a period from a rise of a signal waveform in the Z-phase signal acquired immediately before (Step S110) to a rise of a signal waveform in the Z-phase signal acquired in a current step (Step S130) (Step S140).

The correction unit 33 calculates the number of pulses Pb2 acquired during a period from a rise of a signal waveform presumed based on the number of pulses Pa1 of the AB-phase signal calculated immediately before (before Step S110) to a rise of a signal waveform in the Z-phase signal acquired in the current step (Step S130) (Step S150). The correction unit 33 determines whether the number of pulses Pb1 of the AB-phase signal that has been calculated matches the number of pulses Pb2 presumed from the number of pulses Pa1 generated during a period from a rise of a signal waveform of a Z-phase signal immediately before to a rise of the signal (Step S160).

If the number of pulses Pb1 of the AB-phase signal that has been calculated matches the number of pulses Pb2 of the AB-phase signal that has been presumed, the correction unit 33 determines that an error has not occurred in a portion corresponding to an interval Gdb in an AB-phase signal code wheel CW1, and does not perform correction (Step S170).

If the number of pulses Pb1 of the AB-phase signal that has been calculated does not match the number of pulses Pb2 of the AB-phase signal that has been presumed, the correction unit 33 determines that an error has occurred in the corresponding AB-phase-signal-detection-target portion 2 (Step S171). The correction unit 33 performs correction in which the number of pulses Pb1 that has been calculated is changed to the number of pulses Pb2 that has been presumed (Step S172).

As described above, in the absolute encoder 1B, the Z-phase-signal-rise-detection-target portions 3a and the Z-phase-signal-fall-detection-target portions 3b are provided such that an interval defined by a combination of the Z-phase-signal-rise-detection-target portions 3a and the Z-phase-signal-fall-detection-target portions 3b in each section has a different angle range from the angle ranges of the corresponding intervals in all the other sections, and thus, a relationship among the numbers of pulses of the AB-phase signals generated in the angle ranges, each of which is defined by an interval in the circumferential direction between adjacent ones of the Z-phase-signal-rise-detection-target portions 3a and the Z-phase-signal-fall-detection-target portions 3b, is determined in advance. Accordingly, even when an error that a portion of the AB-phase signal cannot be generated in an angle range defined by an interval in the circumferential direction between specific Z-phase-signal-rise-detection-target portion 3a and Z-phase-signal-fall-detection-target portion 3b occurs, the absolute encoder 1B presumes the AB-phase signal in which the error has occurred by the correction unit 33 from the numbers of pulses of the AB-phase signals generated in the angle ranges, each of which is defined by the interval in the circumferential direction between the adjacent ones of the Z-phase-signal-rise-detection-target portions 3a and the Z-phase-signal-fall-detection-target portions 3b. Thus, the degree of design freedom of a hardware resource of the driving unit 31 can be increased by reducing the processing load of the driving unit 31.

Fifth Embodiment

<Abnormality Detection Unit>

With reference to FIG. 12 and FIG. 15, the absolute encoders 1, 1A, and 1B according to a fifth embodiment of the present teaching will be described below. FIG. 15 is a flowchart illustrating a control mode of detection of abnormalities of the absolute encoders 1, 1A, and 1B by the actuator 26 according to the fifth embodiments of the present teaching.

As illustrated in FIG. 12, an abnormality detection unit 30 of the actuator 26 is provided in the driving unit 31 of the motor 27 that is a portion of the actuator 26. The abnormality detection unit 30 includes a magnetic flux observer. The magnetic flux observer is a mathematical model used to calculate a state of an internal magnetic flux of the motor 27 or the like from a voltage and an electric current applied to the motor 27 and estimates speed or an electric angle of the rotation shaft 27a (a rotor) in the motor 27. The abnormality detection unit 30 can acquire the AB-phase signals and the Z-phase signals from the absolute encoders 1, 1A, and 1B.

As illustrated in FIG. 15, the abnormality detection unit 30 acquires the AB-phase signals and the Z-phase signals from the absolute encoder 1, 1A or 1B (Step S210). The abnormality detection unit 30 calculates an electric angle θx of the rotation shaft 27a, based on the AB-phase signals and the Z-phase signals that have been acquired (Step S220).

Next, the abnormality detection unit 30 estimates an electric angle θy of the rotation shaft 27a by the magnetic flux observer (Step S230).

The abnormality detection unit 30 compares the electric angle θx calculated from the AB-phase signals and the Z-phase signals of the absolute encoder 1, 1A or 1B to the electric angle θy estimated by the magnetic flux observer. If a difference (|θx−θy|) between the electric angle θx and the electric angle θy is a reference value θs or less (Step S240), the abnormality detection unit 30 determines that an abnormality has not occurred in the AB-phase-signal-detection-target portions 2 and the Z-phase-signal-detection-target portions 3 (Step S250).

On the other hand, if the different (|θx−θy|) between the electric angle θx and the electric angle θy is larger than the reference value θs, the abnormality detection unit 30 determines that a strain has been caused in the AB-phase-signal-detection-target portions 2 and the Z-phase-signal-detection-target portions 3 due to deformation, such as plastic deformation or the like, of the rotary body 9 and an abnormality has occurred in generation of the AB-phase signal and the Z-phase signal (Step S251).

Thus, the driving unit 31 can quickly detect abnormalities of the absolute encoders 1, 1A, and 1B, and therefore, the degree of design freedom of a hardware source of the driving unit 31 can be increased by reducing a peak load. The abnormality detection unit 30 may be provided in the AB-phase-signal-detecting unit 4 and the Z-phase-signal-detecting unit 5 of each of the absolute encoders 1, 1A, and 1B.

Sixth Embodiment

<Another Signal Waveform of Z-Phase Signal>

Figure 16:
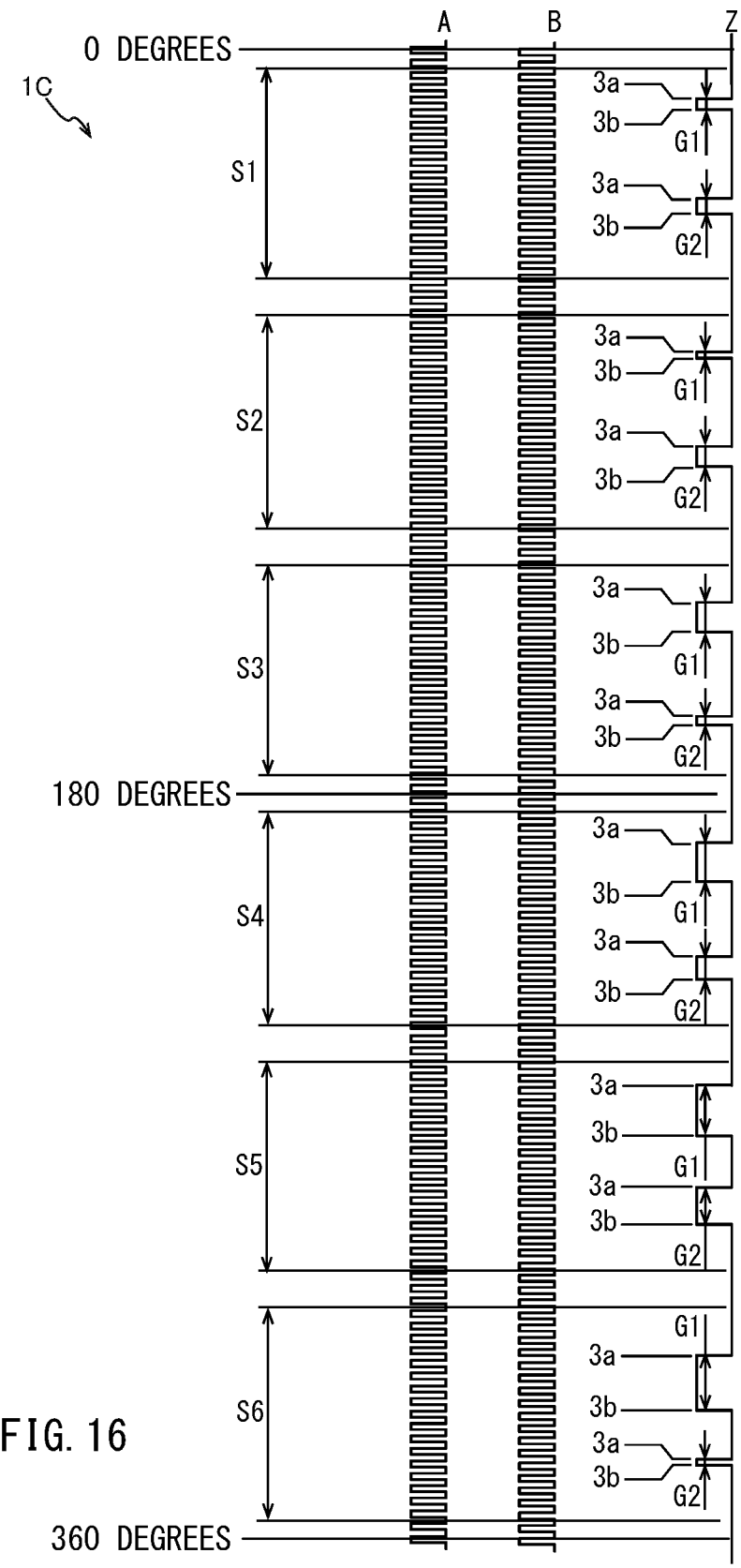
FIG. 16 is a schematic diagram illustrating a signal waveform of an AB-phase signal and a signal waveform of a Z-phase signal according to a sixth embodiment of the present teaching.

With reference to FIG. 16, an absolute encoder 1C according to a sixth embodiment of the present teaching will be described below. FIG. 16 is a schematic diagram illustrating signal waveforms of the AB-phase signal and a signal waveform of the Z-phase signal according to the sixth embodiment of the present teaching. In this embodiment, in an angle range of each section of the rotary body 9, two Z-phase-signal-detection-target portions 3 are positioned. The two Z-phase-signal-detection-target portions 3 are adjacent to each other in the circumferential direction. The Z-phase-signal-rise-detection-target portion 3a and the Z-phase-signal-fall-detection-target portion 3b of each of the Z-phase-signal-detection-target portions 3 are adjacent to each other in the circumferential direction.

As illustrated in FIG. 16, in the absolute encoder 1C, the intervals G1 each between the Z-phase-signal-rise-detection-target portion 3a and the Z-phase-signal-fall-detection-target portion 3b that are adjacent to each other in the circumferential direction in each section are mutually different among the sections, and the intervals G2 each between the Z-phase-signal-rise-detection-target portion 3a and the Z-phase-signal-fall-detection-target portion 3b that are adjacent to each other in the circumferential direction in each section are mutually different among the sections. Accordingly, the absolute encoder 1C generates AB-phase signals having different numbers of pulses in all of the angle ranges of the intervals G1, and AB-phase signals having different numbers of pulses in all of the angle ranges of the intervals G2, each of the angle ranges being defined by respective mechanical angles of the Z-phase-signal-rise-detection-target portion 3a and the Z-phase-signal-fall-detection-target portion 3b that are adjacent to each other in the circumferential direction in each section.

Similarly, the absolute encoder 1C generates AB-phase signals having different numbers of pulses in all of the angle ranges each being defined by respective mechanical angles of the Z-phase-signal-fall-detection-target portion 3b and the Z-phase-signal-fall-detection-target portion 3b that are adjacent to each other in the circumferential direction in each section. Similarly, the absolute encoder 1C generates AB-phase signals having different numbers of pulses in all of the angle ranges each being defined by respective mechanical angles of the Z-phase-signal-rise-detection-target portion 3a and the Z-phase-signal-rise-detection-target portion 3a that are adjacent to each other in the circumferential direction in each section.

In a case where the angle ranges each defined by a combination of the respective mechanical angles of the Z-phase-signal-rise-detection-target portion 3a and the Z-phase-signal-fall-detection-target portion 3b are mutually different among the sections, the driving unit 31 can cause interruption processing to occur in both of a rise and a fall of a waveform in one Z-phase signal. Thus, the driving unit 31 can increase opportunities of detection of a rotation angle during one rotation of the rotation shaft 27a. On the other hand, the driving unit 31 can suppress a calculation load by causing interruption processing to occur in one of a rise or a fall of the signal waveform in the one Z-phase signal.

Other Embodiments

In the second embodiment described above, the multi joint robot arm 12 that is a six-axis vertical multi join robot arm is configured, as an example, such that the S-axis rotary joint 14, the L-axis rotary joint 16, the U-axis rotary joint 18, the R-axis rotary joint 20, the B-axis rotary joint 22, and the T-axis rotary joint 24 are connected in series via links, but is not limited thereto. As for a connection order in which the motor units M of the axes are connected, axial directions when the axes are connected, or the like, any other configuration than that of the second embodiment described above may be employed if the configuration can function as a multi-joint robot arm.

In all of the embodiments described above, the motor unit M is used as the rotary joint of each axis of the multi joint robot arm 12. However, a configuration of the motor unit M is not limited to the configurations of the above-described embodiments. For example, the motor unit may be applied to a device, such as an XY table, a vertical conveyance device, or the like, that requires position control, or the like. The motor unit may have a configuration including only an actuator.

In all of the embodiments described above, the actuator 26 is configured as an electromechanical integrated configuration in which the motor 27, the absolute encoder 1 including the brake mechanism 8, and the driving unit 31 are provided in each of the case 15, the case 19, and the case 23 of the multi joint robot arm 12. However, a configuration of the actuator is not limited to the configurations of the above-described embodiments. For example, the actuator may be configured such that the driving unit is arranged outside the cases of the multi-joint robot arm.

In all of the embodiments described above, each of the absolute encoders 1, 1A, 1B, and 1C is a reflection type optical absolute encoder. However, a configuration of the absolute encoder is not limited to the configurations of the above-described embodiments. For example, the absolute encoder may be a transmission type optical absolute encoder, a magnetic absolute encoder, an electromagnetic induction type absolute encoder, or the like.

In all of the embodiments described above, each of the absolute encoders 1, 1A, 1B, and 1C generates 360 pulses of the AB-phase signal for every mechanical angle of 360 degrees. However, a configuration of the absolute encoder is not limited to the configurations of the above-described embodiments. For example, the absolute encoder may be configured to generate a necessary number of pulses in order to ensure necessary rotation accuracy.

In all of the embodiments described above, each of the absolute encoders 1, 1A, 1B, and 1C generates twelve pulses of the Z-phase signal for every mechanical angle of 360 degrees. However, a configuration of the absolute encoder is not limited to the configurations of the above-described embodiments. For example, the absolute encoder may be configured such that the Z-phase signal has two or more pulses and less than the number of pulses of the AB-phase signal for every mechanical angle of 360 degrees.

In all of the embodiments described above, in each of the absolute encoders 1, 1A, 1B, and 1C, the Z-phase-signal-rise-detection-target portions 3a and the Z-phase-signal-fall-detection-target portions 3b may be arranged such that, among the angle ranges defined by combinations of the respective mechanical angles of all of adjacent ones of the Z-phase-signal-rise-detection-target portions 3a and the Z-phase-signal-fall-detection-target portions 3b in the circumferential direction, there are angle ranges in which the numbers of pulses of the AB-phase signals are the same. For example, in a case where twelve intervals are formed of six different numbers of pulses, the computer can detect the rotation angle of the rotation shaft in the motor by acquiring three Z-phase signals and comparing the numbers of pulses of the AB-phase signals.

In all of the embodiments described above, the rotating plate 7 is provided on the rotary body 9 of the brake mechanism 8. However, the rotating plate 7 is not limited to the configurations of the above-described embodiments. For example, the rotating plate 7 may be fixed directly to the rotation shaft of the motor.

In all of the embodiments described above, the rotary body 9 of the brake mechanism 8 includes six engaging protrusions 9a at equal intervals in the circumferential direction. However, the rotary body 9 of the brake mechanism 8 is not limited to the configurations of the above-described embodiments. For example, the rotary body of the brake mechanism may include a plurality of engaging protrusions at equal intervals in the circumferential direction. The rotary body may include a plurality of engaging protrusions at unequal intervals in the circumferential direction.

Embodiments of the present teaching have been described above, but the above-described embodiments are merely illustrative examples of preferred embodiments of the present teaching. Therefore, the present teaching is not limited to the above-described embodiments and the above-described embodiments can be appropriately modified and implemented without departing from the gist of the teaching.

REFERENCE SIGNS LIST 1, 1A, 1B, 1C Absolute encoder
2 AB-phase-signal-detection-target portion
3 Z-phase-signal-detection-target portion
3a Z-phase-signal-rise-detection-target portion
3b Z-phase-signal-fall-detection-target portion
4 AB-phase-signal-detecting unit
5 Z-phase-signal-detecting unit
6 Output unit
7 Rotating plate
8 Brake mechanism
9 Rotary body
9a Engaging protrusion
10 Engaging pin
11 Multi-joint-robot-arm device
12 Multi-joint robot arm
27 Motor
31 Driving unit
27a Rotation shaft G1, G, G3, G4, G5, G6 Interval
S1, S2, S3, S4, S5, S6 Section

The invention claimed is:

1. An absolute encoder for acquiring a rotation angle of a measurement target member within a mechanical angle of 360 degrees, the absolute encoder comprising:
a brake mechanism including
a rotary body including a plurality of engaging protrusions, and
an engaging pin that engages with one of the plurality of engaging protrusions;
a plurality of AB-phase-signal-detection-target portions that are arranged at equal intervals in a circumferential direction within a range of the mechanical angle of 360 degrees and that are configured to generate AB-phase signals;
a plurality of Z-phase-signal-detection-target portions, each including
a Z-phase-signal-rise-detection-target portion that generates a rise of a Z-phase signal, and
a Z-phase-signal-fall-detection-target portion that generates a fall of the Z-phase signal,
the plurality of Z-phase-signal-detection-target portions being arranged in the circumferential direction within the range of the mechanical angle of 360 degrees, such that the Z-phase-signal-rise-detection-target portions and the Z-phase-signal-fall-detection-target portions are alternately located in the circumferential direction, to thereby form
a plurality of first intervals in the circumferential direction, each between one of the Z-phase-signal-rise-detection-target portions and one of the Z-phase-signal-fall-detection-target portions that are adjacent to each other in the circumferential direction,
a plurality of second intervals in the circumferential direction, each between one of the Z-phase-signal-rise-detection-target portions and one of the Z-phase-signal-rise-detection-target portions that are adjacent to each other in the circumferential direction, and
a plurality of third intervals in the circumferential direction, each between one of the Z-phase-signal-fall-detection-target portions and one of the Z-phase-signal-fall-detection-target portions that are adjacent to each other in the circumferential direction; and
an output unit that is configured to output the AB-phase signals and the Z-phase signals, wherein
the AB-phase-signal-detection-target portions, the Z-phase-signal-rise-detection-target portions, the Z-phase-signal-fall-detection-target portions, and the rotary body integrally rotate;
the engaging protrusions of the rotary body are positioned to divide a rotation range of the rotary body into a plurality of restriction ranges; and
the plurality of Z-phase-signal-detection-target portions are so arranged that
each of the AB-phase-signal-detection-target portions is located between one of the Z-phase-signal-rise-detection-target portions and one of the Z-phase-signal-fall-detection-target portions that are adjacent to each other in the circumferential direction, and
each of the plurality of restriction ranges includes at least
one of the Z-phase-signal-rise-detection-target portions, and one of the Z-phase-signal-fall-detection-target portions,
wherein
the first intervals in the restriction ranges are different from each other, and/or
the second intervals in the restriction ranges are different from each other, and/or
the third intervals in the restriction ranges are different from each other.

2. The absolute encoder according to claim 1, wherein the Z-phase-signal-rise-detection-target portions and the Z-phase-signal-fall-detection-target portions in the plurality of Z-phase-signal-detection-target portions are so arranged that a plurality of angle ranges are formed in the circumferential direction, each being defined by one of the first intervals,
each of the plurality of engaging protrusions is located in one of the angle ranges, and
one of the first intervals in one of the angle ranges is a same as at least another one of the first intervals in another one of the angle ranges.

3. The absolute encoder according to claim 1, wherein the rotary body includes at least two engaging protrusions within the range of the mechanical angle of 360 degrees.

4. The absolute encoder according to claim 1, wherein the rotary body includes six engaging protrusions within the range of the mechanical angle of 360 degrees.

5. The absolute encoder according to claim 1, wherein the first intervals are mutually different among the plurality of restriction ranges, and a difference between a first median that is a median of the first intervals and a smallest one of the first intervals, and a difference between the first median and a largest one of the first intervals, are both smaller than a half of the first median, and/or
the second intervals are mutually different among the plurality of restriction ranges, and a difference between a second median that is a median of the second intervals and a smallest one of the second intervals, and a difference between the second median and a largest one of the second intervals, are both smaller than a half of the second median, and/or
the third intervals are mutually different among the plurality of restriction ranges, and a difference between a third median that is a median of the third intervals and a smallest one of the third intervals, and a difference between the third median and a largest one of the third intervals, are both smaller than a half of the third median.

6. The absolute encoder according to claim 5, wherein
in a case where the first intervals are mutually different among the plurality of restriction ranges, a difference between the smallest one of the first intervals and the largest one of the first intervals is smaller than the half of the first median,
in a case where the second intervals are mutually different among the plurality of restriction ranges, a difference between the smallest one of the second intervals and the largest one of the second intervals is smaller than the half of the second median, and
in a case where the third intervals are mutually different among the plurality of restriction ranges, a difference between the smallest one of the third intervals and the largest one of the third intervals is smaller than the half of the third median.

7. The absolute encoder according to claim 1, further comprising:
a rotating plate that integrally rotates with the rotary body, wherein
the plurality of AB-phase-signal-detection-target portions, the plurality of Z-phase-signal-rise-detection-target portions, and the plurality of Z-phase-signal-fall-detection-target portions, are formed on the rotating plate.

8. The absolute encoder according to claim 1, wherein the rotary body includes the plurality of AB-phase-signal-detection-target portions, the plurality of Z-phase-signal-rise-detection-target portions, and the plurality of Z-phase-signal-fall-detection-target portions.

9. The absolute encoder according to claim 8, further comprising:
an abnormality detection unit that detects an abnormality of the Z-phase signal due to deformation of the rotary body.

10. The absolute encoder according to claim 9, wherein the absolute encoder is provided in a motor, and
the abnormality detection unit detects the abnormality of the Z-phase signal based on an electric angle of the motor.

11. The absolute encoder according to claim 1, further comprising:
an AB-phase-signal-detecting unit that detects the AB-phase-signal-detection-target portion; and
a Z-phase-signal-detecting unit that detects the Z-phase-signal-rise-detection-target portions and the Z-phase-signal-fall-detection-target portions, wherein
the AB-phase signal is generated via detection of the AB-phase-signal-detection-target portion by the AB-phase-signal-detecting unit,
the Z-phase signal is generated via detection of the Z-phase-signal-rise-detection-target portions and the Z-phase-signal-fall-detection-target portions by the Z-phase-signal-detecting unit, and
the absolute encoder further includes an error correction unit that corrects an error of the AB-phase signal from a number of the AB-phase signals generated in
an interval from a rise of a signal waveform to a fall of the signal waveform,
an interval from the rise of the signal waveform to a rise in an adjacent signal waveform,
an interval from the fall of the signal waveform to a fall in an adjacent signal waveform, or
an interval from the fall of the signal waveform to another rise in an adjacent waveform,
in the plurality of Z-phase signals.

12. The absolute encoder according to claim 1, wherein
in a case where the rotation range of the rotary body is limited by the brake mechanism, the Z-phase-signal-detecting unit detects the Z-phase-signal-rise-detection-target portion and the Z-phase-signal-fall-detection-target portion while the rotary body rotates clockwise and counterclockwise a plurality of times in a range in which the rotary body is rotatable.

* * * * *